(12) United States Patent
Gong et al.

(10) Patent No.: US 10,637,256 B2
(45) Date of Patent: Apr. 28, 2020

(54) CHARGING MODE AUTO-DETECTION MODULE FOR CHARGING CIRCUIT AND ASSOCIATED METHOD

(71) Applicant: Chengdu Monolithic Power Systems Co., Ltd., Chengdu (CN)

(72) Inventors: Junyong Gong, Chengdu (CN); Changjiang Chen, Chengdu (CN); Jian Jiang, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 261 days.

(21) Appl. No.: 15/730,254

(22) Filed: Oct. 11, 2017

(65) Prior Publication Data

US 2018/0131196 A1    May 10, 2018

(30) Foreign Application Priority Data

Oct. 12, 2016 (CN) .......................... 2016 1 0889104

(51) Int. Cl.
*H02J 7/00* (2006.01)
*H02J 7/04* (2006.01)

(52) U.S. Cl.
CPC .......... *H02J 7/0008* (2013.01); *H02J 7/0052* (2013.01); *H02J 7/045* (2013.01); *H02J 2007/0062* (2013.01)

(58) Field of Classification Search
CPC ........ H02J 7/008; H02J 7/0052; H02J 7/0045; H02J 2007/0062; G06F 1/266; G06F 13/4282; G06F 2213/3812; G06F 2213/40; G06F 2213/4002; G06F 2213/4004

USPC .......................................................... 320/149
See application file for complete search history.

(56) References Cited

U.S. PATENT DOCUMENTS

| | | | | |
|---|---|---|---|---|
| 9,866,055 | B2* | 1/2018 | Agarwal ................. | H02J 7/007 |
| 2012/0119696 | A1* | 5/2012 | Picard ................... | H01M 10/48 320/107 |
| 2012/0306455 | A1* | 12/2012 | Fischbach ............. | H02J 7/0052 320/162 |
| 2015/0084579 | A1* | 3/2015 | Li ......................... | H02J 7/0052 320/107 |
| 2016/0028250 | A1* | 1/2016 | Patnaik .................. | H02J 7/007 710/16 |
| 2016/0370835 | A1* | 12/2016 | Erickson ................ | G06F 1/266 |
| 2017/0085098 | A1* | 3/2017 | Sporck ................... | H02J 7/007 |
| 2017/0194805 | A1* | 7/2017 | Kong ..................... | H02J 7/0027 |
| 2018/0074564 | A1* | 3/2018 | Paparrizos ............. | G06F 1/266 |

FOREIGN PATENT DOCUMENTS

CN    106329627 A  *  1/2017  ............ H01M 10/44

* cited by examiner

*Primary Examiner* — Richard Isla
*Assistant Examiner* — Michael N Dibenedetto
(74) *Attorney, Agent, or Firm* — Perkins Coie LLP

(57) ABSTRACT

A charging mode auto-detection module for a charging circuit and associated charging mode auto-detection method. The charging mode auto-detection module compatibly includes a voltage dividing charging mode, a BC1.2 mode, a SAMSUNG 1.2V/1.2V charging mode and a QC3.0 mode and can detect which of the charging modes is an adaptable charging mode to a needing to be charged device and generate an indication signal indicative of a required charging voltage by the needing to be charged device so that the charging circuit can regulate its bus voltage to the required charging voltage based on the indication signal.

24 Claims, 6 Drawing Sheets

CHARGING MODE AUTO-DETECTION MODULE FOR CHARGING CIRCUIT AND ASSOCIATED METHOD

CROSS REFERENCE

This application claims the benefit of CN application No. 201610889104.1 filed on Oct. 12, 2016 and incorporated herein by reference.

TECHNICAL FIELD

This disclosure relates generally to charging circuit, and more particularly but not exclusively relates to charging mode auto-detection of charging circuit.

BACKGROUND

Various portable electronic devices may adopt various charging protocols. For instance, the main charging protocols adopted by the portable electronic devices currently in market may include Apple's voltage dividing charging mode, BC 1.2 dedicated charging port ("DCP") mode, SAMSUNG 1.2V/1.2V charging mode and Quick Charging ("QC") 3.0 mode. Besides these main charging protocols, there of course exist other charging protocols such as USB PD and MTK quick charging etc. A charger or a power adaptor should provide appropriate charging protocol that matches the portable electronic device it intends to charge before the charger/the power adaptor actually provides energy to charge the portable electronic device. Otherwise, the portable electronic device cannot be charged or can only be charged with very small charging current and thus takes a very long time to be charged up. With the requirements for usage convenience and higher charging speed, a charging circuit provides multiple charging protocols with auto matching of charging protocol to the portable electronic device needing to be charged is desired.

SUMMARY

In accomplishing the above and other objects, there has been provided, in accordance with an embodiment of the present disclosure, a charging mode auto-detection module for a charging circuit.

The charging mode auto-detection module may include a voltage dividing charging mode, a BC1.2 mode, a SAMSUNG 1.2V/1.2V charging mode and a QC3.0 mode and is configured to detect which of the charging modes matches a needing to be charged device that is coupled to the charging circuit.

The charging mode auto-detection module may comprise a voltage dividing mode determining module, configured to detect whether a data positive port voltage at a data positive port of the charging circuit exceeds a voltage dividing mode threshold window or a data negative port voltage at a data negative port of the charging circuit exceeds the voltage dividing mode threshold window to determine whether a voltage dividing charging mode matches a needing to be charged device, wherein when both the data positive port voltage and the data negative port voltage are within the voltage dividing mode threshold window, the voltage dividing charging mode determining module determines that the voltage dividing charging mode matches the needing to be charged device and the charging mode auto-detection module remains in the voltage dividing charging mode, and wherein when either the data positive port voltage or the data negative port voltage exceeds the voltage dividing mode threshold window, the voltage dividing charging mode determining module determines that the voltage dividing charging mode does not match the needing to be charged device, and the charging mode auto-detection module exits the voltage dividing charging mode and enters into a BC1.2 mode.

The charging mode auto-detection module may further comprise a BC1.2 mode determining module, configured to detect whether the data positive port voltage exceeds a BC1.2 mode threshold window to determine whether a BC1.2 mode or a SAMSUNG 1.2V/1.2V charging mode matches the needing to be charged device, wherein when the data positive port voltage is within the BC1.2 mode threshold window, the BC1.2 mode determining module determines that the BC1.2 mode or the SAMSUNG 1.2V/1.2V charging mode matches the needing to be charged device and the charging mode auto-detection module remains in the BC1.2 mode or the SAMSUNG 1.2V/1.2V charging mode, and wherein when the data positive port voltage exceeds the BC1.2 mode threshold window, the BC1.2 mode determining module determines that both the BC1.2 mode and the SAMSUNG 1.2V/1.2V charging mode do not match the needing to be charged device, and the charging mode auto-detection module is configured to exit the BC1.2 mode and the SAMSUNG 1.2V/1.2V charging mode and to pull the data negative port voltage to a reference ground.

The charging mode auto-detection module may further comprise a QC3.0 mode detecting module, configured to detect whether the data positive port voltage is within a QC3.0 mode threshold window to determine whether the charging mode auto-detection module enters into the QC3.0 mode, wherein when the data positive port voltage VDP is within the QC3.0 mode threshold window, the QC3.0 mode detecting module determines that the charging mode auto-detection module needs to enter into the QC3.0 mode, and wherein when the data positive port voltage VDP exceeds the QC3.0 mode threshold window, the QC3.0 mode detecting module determines that the charging mode auto-detection module does not need to enter into the QC3.0 mode.

There has been provided, in accordance with an embodiment of the present disclosure, a charging circuit comprising the charging mode auto-detection module. The charging mode auto-detection module can generate an indication signal which is indicative of a required charging voltage by the needing to be charged device in each of the voltage dividing charging mode, the BC1.2 mode, the SAMSUNG 1.2V/1.2V charging mode and the QC3.0 mode.

The charging circuit further comprises a power switch, coupled between a power supply port and the bus port; a reference signal generation module, configured to receive the indication signal and to generate a reference signal; a power supply detection module, configured to detect a supply voltage provided to the power supply port and to generate a supply detection signal indicative of the supply voltage; a power supply regulation module, configured to respectively receive the reference signal and the supply detection signal, and to conduct operation to the reference signal and the supply detection signal to provide an adjusting signal indicative of a difference between the reference signal and the supply detection signal; and an adjusting port, configured to receive the adjusting signal and to couple the adjusting signal to a feedback signal receiving port of a power supply so that the power supply is configured to adjust the supply voltage to the required charging voltage by the needing to be charged device based on the adjusting signal.

There has been provided, in accordance with an embodiment of the present disclosure, a charging mode auto-detection method for a charging circuit. The charging mode auto-detection method comprises: entering into a voltage dividing charging mode in default when a needing to be charged device is connected to the charging circuit, setting a data positive port voltage at a data positive port of the charging circuit and a data negative port voltage at a data negative port of the charging circuit to a first predetermined voltage in the voltage dividing charging mode, and disconnecting the data positive port and the data negative port from the first predetermined voltage when the charging circuit exits the voltage dividing charging mode; determining whether the voltage dividing charging mode matches the needing to be charged device, wherein if the voltage dividing charging mode matches the needing to be charged device, the charging circuit remains in the voltage dividing charging mode, else the charging circuit exits the voltage dividing charging mode and enters into a BC1.2 mode and after entered into the BC1.2 mode for a first delay time, the charging circuit enters into a SAMSUNG 1.2V/1.2V charging mode; determining whether the BC1.2 mode or the SAMSUNG 1.2V/1.2V charging mode matches the needing to be charged device, wherein if the BC1.2 mode or the SAMSUNG 1.2V/1.2V charging mode matches the needing to be charged device, the charging circuit remains in the BC1.2 mode or the SAMSUNG 1.2V/1.2V charging mode, else the charging circuit exits the BC1.2 mode and the SAMSUNG 1.2V/1.2V charging mode and pulls the data negative port voltage to a reference ground; detecting whether the charging circuit needs to enter into a QC3.0 mode, wherein if the charging circuit is detected needing to enter into the QC3.0 mode, it enters into the QC3.0 mode, else continuing with the detecting of whether the charging circuit needs to enter into the QC3.0 mode; and determining whether the QC3.0 mode matches the needing to be charged device in the QC3.0 mode, wherein if the QC3.0 mode matches the needing to be charged device, the charging circuit remains in the QC3.0 mode, else the charging circuit exits the QC3.0 mode and returns to the voltage dividing charging mode.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
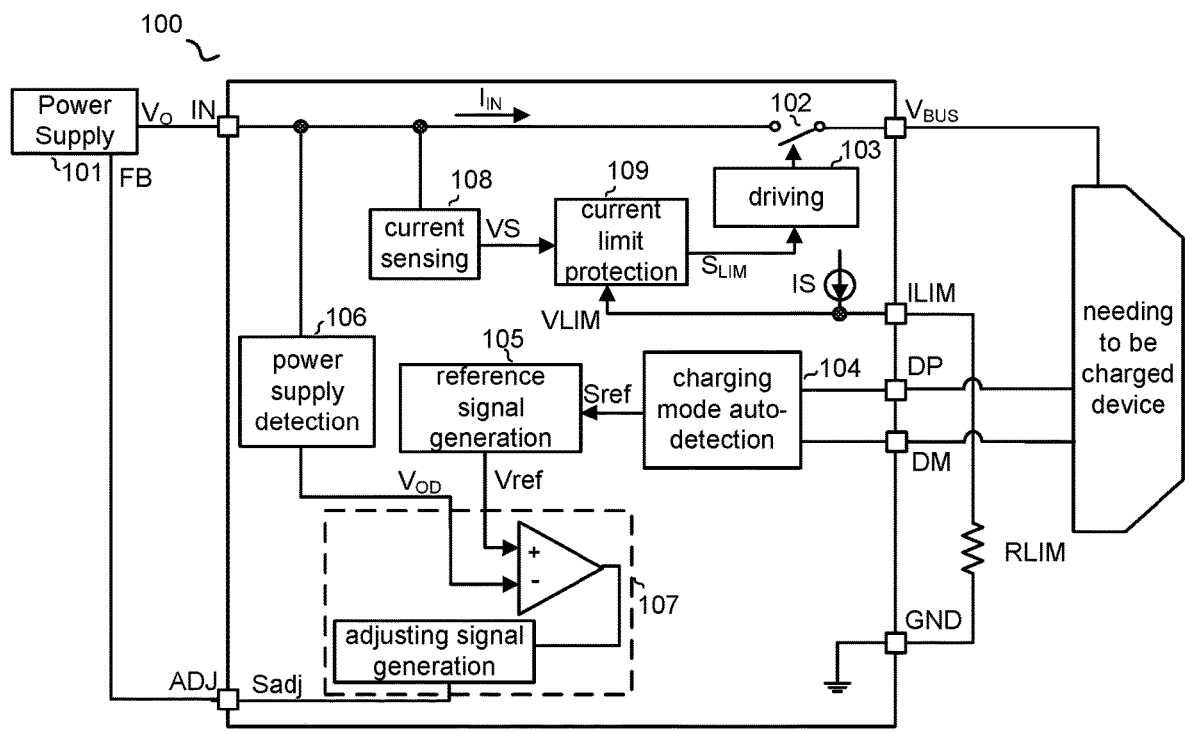
FIG. 1 illustrates a schematic block diagram of a charging circuit 100 in accordance with an embodiment of the present invention.

FIG. 1 illustrates a schematic block diagram of a charging circuit 100 in accordance with an embodiment of the present invention. The charging circuit 100 may have a bus port $V_{BUS}$ for providing a bus voltage (also labeled with $V_{BUS}$) and a power supply port IN which may be coupled to a power supply 101 to receive a supply voltage Vo from the power supply 101. The charging circuit 100 may comprise a power switch 102 coupled between the power supply port IN and the bus port $V_{BUS}$, a driving module 103 configured to provide a control signal DR to control the power switch 102; a data positive port DP and a data negative port DM coupled to a charging mode auto-detection module 104. The charging mode auto-detection module 104 may include voltage dividing charging mode (referrred to as "voltage dividing mode" in the following), BC1.2 dedicated charging port ("DCP") mode (referrred to as "BC1.2 mode" in the following), SAMSUNG 1.2V/1.2V charging mode and Quick Charging ("QC") 3.0 mode and may be configured to detect which of the charging modes is adaptable to a needing to be charged device that is coupled to the bus port $V_{BUS}$, the data positive port DP and the data negative port DM, and automatically match the adaptable charging mode with the needing to be charged device. The charging mode auto-detection module 104 may further be configured to send an indication signal Sref which is indicative of a required charging voltage by the needing to be charged device to a reference signal generation module 105 at the adaptable charging mode. The reference signal generation module 105 may be configured to generate a reference signal Vref which is also indicative of the required charging voltage by the needing to be charged device. The charging circuit 100 may further comprise a power supply detection module 106 which may be configured to detect the supply voltage Vo provided by the power supply 101 and to generate a supply detection signal $V_{OD}$ indicative of the supply voltage Vo. The charging circuit 100 may further comprise a power supply regulation module 107 configured to respectively receive the reference signal Vref and the supply detection signal $V_{OD}$, and to conduct operation (e.g. through an adjusting signal generation module) to the reference signal Vref and the supply detection signal $V_{OD}$ to provide an adjusting signal Sadj indicative of a difference between the reference signal Vref and the supply detection signal $V_{OD}$ to an adjusting port ADJ of the charging circuit 100. The adjusting port ADJ may be coupled to a feedback signal receiving port FB of the power supply 101 so that the power supply 101 may adjust the supply voltage Vo to the required charging voltage by the needing to be charged device based on the adjusting signal Sadj.

The charging circuit 100 may further comprise a current limit setting port ILIM, a current sensing module 108 and a current limit protection circuit 109. The current limit setting port ILIM may be configured to be coupled to external circuit element(s) so that a user can set a current limit threshold VLIM. For instance, in an embodiment, the current limit setting port ILIM may be coupled to the reference ground GND through a setting resistor RLIM and a setting current IS may be provided to the current limit setting port ILIM which flows through the setting resistor RLIM resulting in the current limit threshold VLIM. The current sensing module 108 may be coupled to the power supply port IN to sense a supply current $I_{IN}$ flowing through the power switch 102 to generate a current sensing signal VS indicative of the supply current $I_{IN}$. The current limit protection circuit 109 may be configured to receive the current sensing signal VS and the current limit threshold VLIM, and to generate a current limit protection signal $S_{LIM}$ to the driving module 103 based on the current sensing signal VS and the current limit threshold VLIM. When the current sensing signal VS is higher than the current limit threshold VLIM, the current limit protection signal $S_{LIM}$ is configured to trigger the control signal DR of the driving module 103 to set the current flowing through the power switch 102 at a predetermined current value.

Figure 2:
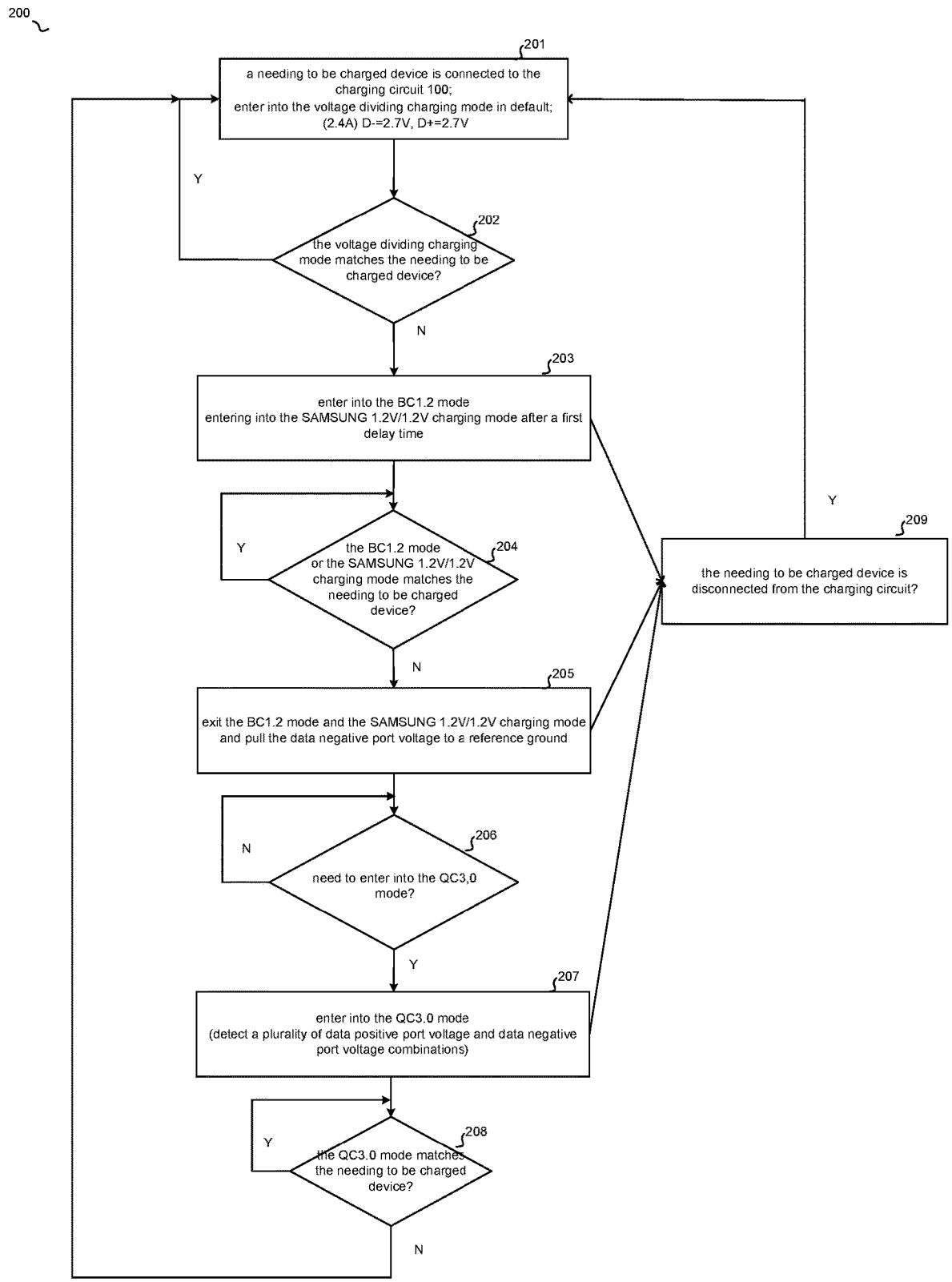
FIG. 2 illustrates a process flow of charging mode detection of the charging mode auto-detection module 104 in accordance with an embodiment of the present invention.
Figure 3:
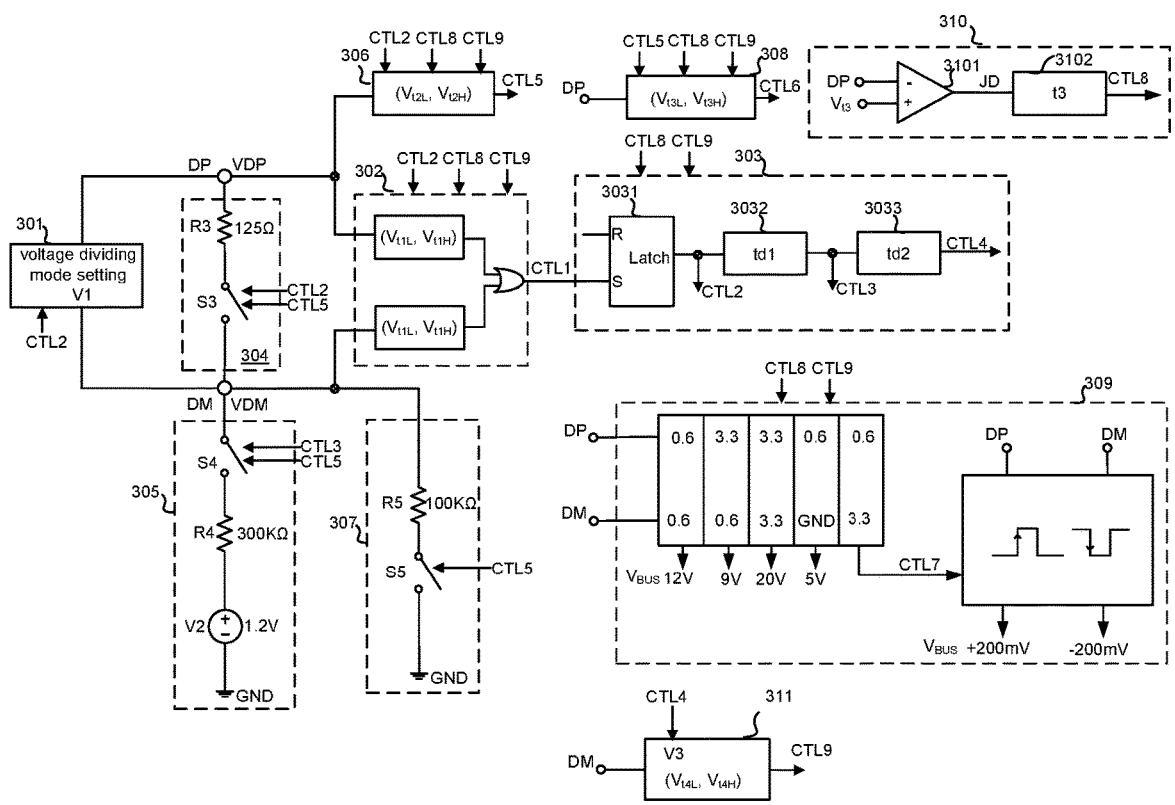
FIG. 3 illustrates a schematic diagram of a charging mode auto-detection module 104 that can be used in the charging circuit 100 in accordance with an embodiment of the present invention.

FIG. 2 illustrates a process flow of charging mode detection of the charging mode auto-detection module 104 in accordance with an embodiment of the present invention. FIG. 3 illustrates a block diagram of the charging mode auto-detection module 104 in accordance with an embodiment of the present invention. Referring to FIG. 2, in step 201, when the needing to be charged device is connected to the charging circuit 100, the charging circuit 100 provides a first bus voltage (e.g. $V_{Bus}$=5V) at the bus port $V_{BUS}$ in default. The charging mode auto-detection module 104 is configured to enter into the voltage dividing charging mode in default. The charging mode auto-detection module 104 may comprise a voltage dividing mode setting module 301, the data positive port DP and the data negative port DM are coupled to the voltage dividing mode setting module 301, as shown in FIG. 3. The voltage dividing mode setting module 301 is configured to set a data positive port voltage VDP at the data positive port DP and a data negative port voltage VDM at the data negative port DM to a first predetermined voltage V1 (e.g. 2.7V) when the charging mode auto-detection module 104 is in the voltage dividing charging mode, and to disconnect the data positive port DP and the data negative port DM from the first predetermined voltage V1 when the charging mode auto-detection module 104 exits the voltage dividing charging mode.

Figure 4:
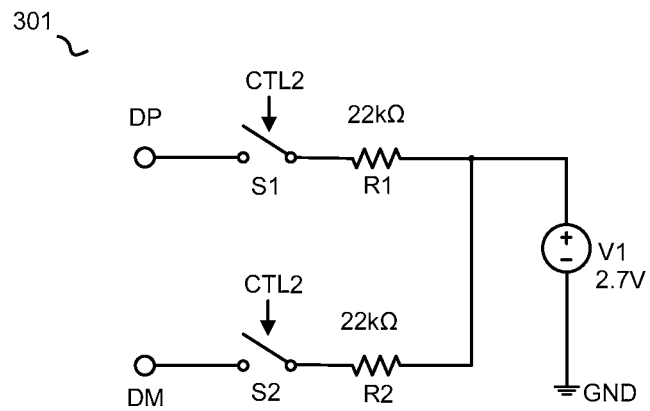
FIG. 4 illustrates a schematic diagram of a voltage dividing mode setting module 301 that can be used in the charging mode auto-detection module 104 of FIG. 3 in accordance with an embodiment of the present invention.

FIG. 4 illustrates a schematic diagram of a voltage dividing mode setting module 301 in accordance with an embodiment of the present invention. The data positive port DP may be coupled to the first predetermined voltage V1 (e.g. 2.7V) through a first controllable switch S1 and a first resistor R1 (e.g. having a resistance of 22 kΩ). The data negative port DM may be coupled to the first predetermined voltage V1 (e.g. 2.7V) through a second controllable switch S2 and a second resistor R2 (e.g. having a resistance of 22 kΩ). In the voltage dividing charging mode, the charging mode auto-detection module 104 is configured to close the first controllable switch S1 and the second controllable switch S2. In an embodiment, as will be described in more detail later in this disclosure, a control terminal of the first controllable switch S1 and a control terminal of the second controllable switch S2 are configured to receive a second control signal CTR2 from a BC 1.2 mode control module 303. The second conotrol signal CTR2 is configured to keep the first controllable switch S1 and the second controllable switch S2 closed when the voltage dividing charging mode matches the needing to be charged device, and is further configured to open the first controllable switch S1 and the second controllable switch S2 when the voltage dividing charging mode does not match the needing to be charged device.

Turning back to FIG. 2, in the voltage dividing charging mode, at step 202, the charging mode auto-detection module 104 determines whether the voltage dividing charging mode matches the needing to be charged device. If the voltage dividing charging mode matches the needing to be charged device, the charging mode auto-detection module 104 remains in the voltage dividing charging mode. Else, the charging mode auto-detection module 104 enters into the BC 1.2 mode. In accordance with an embodiment of the present invention, the mode auto-detection module 104 may be configured to determine whether the voltage dividing charging mode matches the needing to be charged device by detecting whether the data positive port voltage VDP exceeds a voltage dividing mode threshold window ($V_{t1L}$, $V_{t1H}$) or the data negative port voltage VDM exceeds the voltage dividing mode threshold window ($V_{t1L}$, $V_{t1H}$). For instance, in an embodiment, the voltage dividing mode threshold window ($V_{t1L}$, $V_{t1H}$) can be set to (2.3V, 2.9V), i.e. $V_{t1L}$=2.3V, $V_{t1H}$=2.9V. If the data positive port voltage VDP exceeds the voltage dividing mode threshold window ($V_{t1L}$, $V_{t1H}$) or the data negative port voltage VDM exceeds the voltage dividing mode threshold window ($V_{t1L}$, $V_{t1H}$), the charging mode auto-detection module 104 determines that the voltage dividing charging mode does not match the needing to be charged device and exits the voltage dividing charging mode to enter into the BC 1.2 mode. Otherwise, if both the data positive port voltage VDP and the data negative port voltage VDM are within the voltage dividing mode threshold window ($V_{t1L}$, $V_{t1H}$), the charging mode auto-detection module 104 determines that the voltage dividing charging mode matches the needing to be charged device and remains in the voltage dividing charging mode. Meanwhile, the charging mode auto-detection module 104 is configured to send a corresponding indication signal Sref to the reference signal generation module 105 so that the charging circuit 100 can provide appropriate charging voltage to the needing to be charged device based on the indication signal Sref. In an embodiment, to prevent fault determination, when the data positive port voltage VDP exceeds the voltage dividing mode threshold window ($V_{t1L}$, $V_{t1H}$) for a first predetermined time t1 (e.g. 2 ms) or the data negative port voltage VDM exceeds the voltage dividing mode threshold window ($V_{t1L}$, $V_{t1H}$) for the first predetermined time t1 (e.g. 2 ms), the charging mode auto-detection module 104 determines that the voltage dividing charging mode does not match the needing to be charged device and exits the voltage dividing charging mode.

In accordance with an embodiment of the present invention, referrring to FIG. 3, the charging mode auto-detection module 104 may further comprise a voltage dividing mode determining module 302. The data positive port DP and the data negative port DM are coupled to the voltage dividing mode determining module 302. The voltage dividing mode determining module 302 may be configured to detect and determine whether the data positive port voltage VDP exceeds the voltage dividing mode threshold window ($V_{t1L}$, $V_{t1H}$) or the data negative port voltage VDM exceeds the voltage dividing mode threshold window ($V_{t1L}$, $V_{t1H}$) to determine whether the voltage dividing charging mode matches the needing to be charged device, and provide a first control signal CTL1 based on the determination results. In an embodiment, the first control signal CTL1 may have a first logic state (e.g. logic high) and a second logic state (e.g. logic low), wherein the first control signal CTL1 is at the first logic state when the voltage dividing charging mode does not match the needing to be charged device, and is at the second logic state when the voltage dividing charging mode matches the needing to be charged device.

Figure 5:
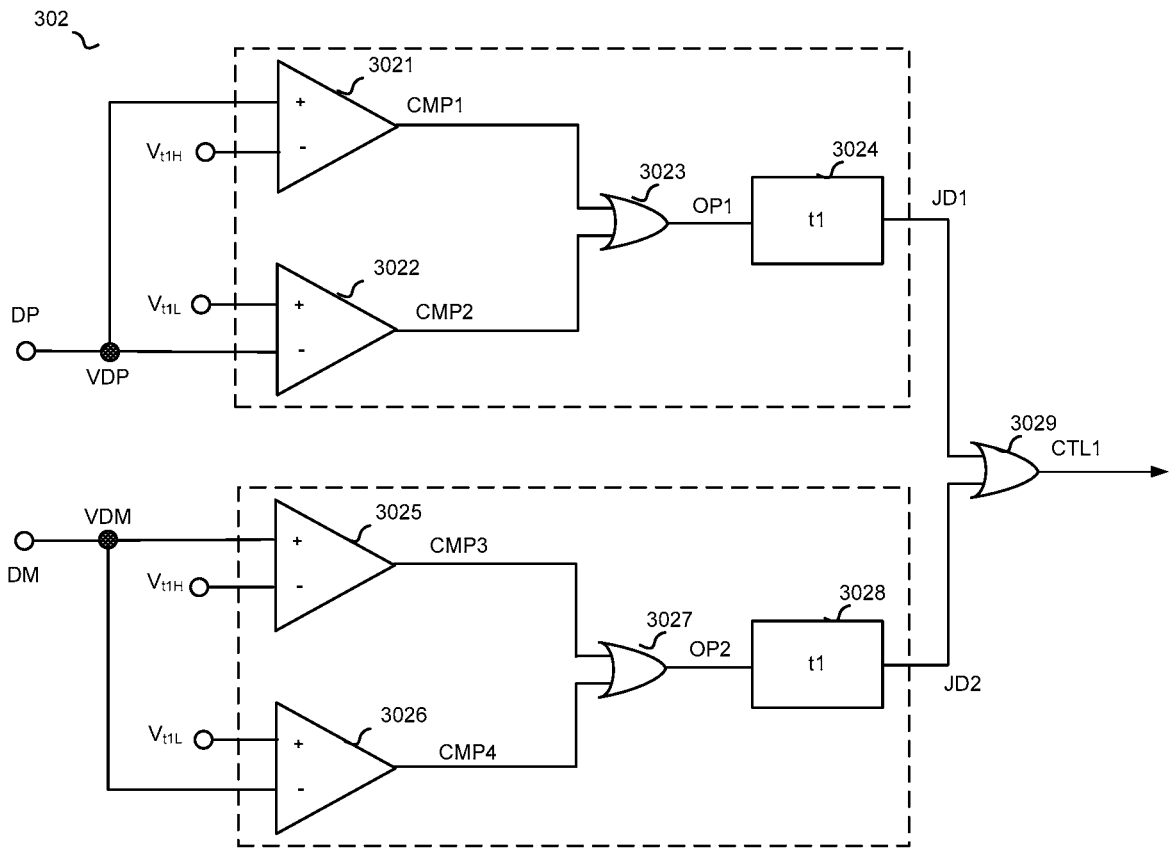
FIG. 5 illustrates a schematic diagram of a voltage dividing mode determining module 302 that can be used in the charging mode auto-detection module 104 of FIG. 3 in accordance with an embodiment of the present invention.

FIG. 5 illustrates a schematic diagram of a voltage dividing mode determining module 302 that can be used in the charging mode auto-detection module 104 of FIG. 3 in accordance with an embodiment of the present invention. In the exemplary embodiment of FIG. 5, the voltage dividing mode determining module 302 may comprise: a first voltage dividing determining circuit, a second voltage dividing determining circuit and a voltage dividing determining logic circuit. The first voltage dividing determining circuit may be coupled to the data positive port DP to detect the data positive port voltage VDP. The first voltage dividing determining circuit may be configured to receive a low threhold $V_{t1L}$ and a high threshold $V_{t1H}$ of the voltage dividing mode threshold window ($V_{t1L}$, $V_{t1H}$), and to compare the data positive port voltage VDP respectively with the low threshold $V_{t1L}$ and the high threshold $V_{t1H}$ of the voltage dividing mode threshold window ($V_{t1L}$, $V_{t1H}$) to provide a first voltage dividing determining signal JD1. If the data positive port voltage VDP is higher than the high threshold $V_{t1H}$ or lower than the low threshold $V_{t1L}$ for the first predetermined time t1 (e.g. 2 ms), the first voltage dividing determining signal JD1 has a first logic state (e.g. logic high), else the voltage dividing determining signal JD1 has a second logic state (e.g. logic low). The second voltage dividing determining circuit may be coupled to the data negative port DM to detect the data negative port voltage VDM. The second voltage dividing determining circuit may be configured to receive the low threhold $V_{t1L}$ and the high threshold $V_{t1H}$ of the voltage dividing mode threshold window ($V_{t1L}$, $V_{t1H}$), and to compare the data negative port voltage VDM respectively with the low threshold $V_{t1L}$ and the high threshold $V_{t1H}$ of the voltage dividing mode threshold window ($V_{t1L}$, $V_{t1H}$) to provide a second voltage dividing determining signal JD2. If the data negative port voltage VDM is higher than the high threshold $V_{t1H}$ or lower than the low threshold $V_{t1L}$ for the first predetermined time t1 (e.g. 2 ms), the second voltage dividing determining signal JD2 has a first logic state (e.g. logic high), else the second voltage dividing determining signal JD2 has a second logic state (e.g. logic low). The voltage dividing determining logic circuit may be configured to receive the first voltage dividing determining signal JD1 and the second voltage dividing determining signal JD2, and to conduct logic operation to the first voltage dividing determining signal JD1 and the second voltage dividing determining signal JD2 to provide the first control signal CTL1 so that the first control signal CTL1 has the first logic state when the first voltage dividing determining signal JD1 has the first logic state or the second voltage dividing determining signal JD2 has the first logic state, else the first control signal CTL1 has the second logic state.

In accordance with an embodiment of the present invention, the first voltage dividing determining circuit may comprise a first comparator 3021, a second comparator 3022, a first OR logic operation circuit 3023 and a first timing circuit 3024. The first comparator 3021 may have a first input terminal (e.g. the "+" input terminal of 3021 in FIG. 5) configured to receive the data positive port voltage VDP, a second input terminal (e.g. the "−" input terminal of 3021 in FIG. 5) configured to receive the high threshold $V_{t1H}$ of the voltage dividing mode threshold window ($V_{t1L}$, $V_{t1H}$), and an output terminal configured to output a first comparison signal CMP1. The second comparator 3022 may have a first input terminal (e.g. the "+" input terminal of 3022 in FIG. 5) configured to receive the low threshold $V_{t1L}$ of the voltage dividing mode threshold window ($V_{t1L}$, $V_{t1H}$), a second input terminal (e.g. the "−" input terminal of 3022 in FIG. 5) configured to receive the data positive port voltage VDP, and an output terminal configured to output a second comparison signal CMP2. The first OR logic operation circuit 3023 may be configured to receive the first comparison signal CMP1 and the second comparison signal CMP2, and to conduct OR logic operation to the first comparison signal CMP1 and the second comparison signal CMP2 to provide a first operation result OP1 so that the first operation result OP1 has a first logic state (e.g. logic high) when the data positive port voltage VDP is higher than the high threshold $V_{t1H}$ of the voltage dividing mode threshold window ($V_{t1L}$, $V_{t1H}$) or lower han the low threshold $V_{t1L}$ of the voltage dividing mode threshold window ($V_{t1L}$, $V_{t1H}$), else the first operation result OP1 has a second logic state (e.g. logic low). The first timing circuit 3024 may be configured to receive the first operation result OP1, to time duration of the first logic state of the first operation result OP1, and to provide the first voltage dividing determining signal JD1 based on the timing. If the duration of the first logic state of the first operation result OP1 reaches the first predetermined time t1, the first voltage dividing determining signal JD1 has the first logic state, else the first voltage dividing determining signal JD1 has the second logic state.

In accordance with an embodiment of the present invention, the second voltage dividing determining circuit may comprise a third comparator 3025, a fourth comparator 3026, a second OR logic operation circuit 3027 and a second timing circuit 3028. The third comparator 3025 may have a first input terminal (e.g. the "+" input terminal of 3025 in FIG. 5) configured to receive the data negative port voltage VDM, a second input terminal (e.g. the "−" input terminal of 3025 in FIG. 5) configured to receive the high threshold $V_{t1H}$ of the voltage dividing mode threshold window ($V_{t1L}$, $V_{t1H}$), and an output terminal configured to output a third comparison signal CMP3. The fourth comparator 3026 may have a first input terminal (e.g. the "+" input terminal of 3026 in FIG. 5) configured to receive the low threshold $V_{t1L}$ of the voltage dividing mode threshold window ($V_{t1L}$, $V_{t1H}$), a second input terminal (e.g. the "−" input terminal of 3026 in FIG. 5) configured to receive the data negative port voltage VDM, and an output terminal configured to output a fourth comparison signal CMP4. The second OR logic operation circuit 3027 may be configured to receive the third comparison signal CMP3 and the fourth comparison signal CMP4, and to conduct OR logic operation to the third comparison signal CMP3 and the fourth comparison signal CMP4 to provide a second operation result OP2 so that the second operation result OP2 has a first logic state (e.g. logic high) when the data negative port voltage VDM is higher than the high threshold $V_{t1H}$ of the voltage dividing mode threshold window ($V_{t1L}$, $V_{t1H}$) or lower than the low threshold $V_{t1L}$ of the voltage dividing mode threshold window ($V_{t1L}$, $V_{t1H}$), else the second operation result OP2 has a second logic state (e.g. logic low). The second timing circuit 3028 may be configred to receive the second operation result OP2, to time duration of the first logic state of the second operation result OP2, and to provide the second voltage dividing determining signal JD2 based on the timing. If the duration of the first logic state of the second operation result OP2 reaches the first predetermined time t1, the second voltage dividing determining signal JD2 has the first logic state, else the second voltage dividing determining signal JD2 has the second logic state.

In accordance with an embodiment of the present invention, the voltage dividing determining logic circuit may comprise a third OR logic operation circuit 3029 configured to receive the first voltage dividing determining signal JD1 and the second voltage dividing determining signal JD2, and to conduct OR logic operation to the first voltage dividing determining signal JD1 and the second voltage dividing determining signal JD2 to generate the first control signal CTL1.

Turning back to FIG. 2, if the charging mode auto-detection module 104 determines that the voltage dividing charging mode does not match the needing to be charged device, step 203 will be executed and the charging mode auto-detection module 104 is configured to enter into the BC 1.2 mode. In an embodiment, after entered into the BC 1.2 mode for a first delay time td1 (e.g. td1=1 s), the charging mode auto-detection module 104 is further configured to enter into the SAMSUNG 1.2V/1.2V charging mode. In an embodiment, after entered into the SAMSUNG 1.2V/1.2V charging mode for a second delay time td2 (e.g. td2=1 s), the charging mode auto-detection module 104 is further configured to detect whether the needing to be charged device is disconnected from the charging circuit 100 (see step 209). However, one of ordinary skill in the art would understand that this is not intended to be limiting. In other embodiment, the charging mode auto-detection module 104 may be configured to detect whether the needing to be charged device is disconnected from the charging circuit 100 once it enters into the BC 1.2 mode (without any delay), or may be configured to detect whether the needing to be charged device is disconnected from the charging circuit 100 once it enters into the SAMSUNG 1.2V/1.2V charging mode (without any delay).

In accordance with an embodiment of the present invention, referring to FIG. 3, the charging mode auto-detection module 104 may further comprise: a BC 1.2 mode control module 303, a BC 1.2 mode setting module 304 and a SAMSUNG 1.2V/1.2V charging mode setting module 305.

The BC 1.2 mode control module 303 may be configured to receive the first control signal CTL1 from the voltage dividing mode determining module 302 and to generate a second control signal CTL2, a third control signal CTL3 and a fourth control signal CTL4 based on the first control signal CTL1. The second control signal CTL2 is configured to disable the voltage dividing mode determining module 302 and to control the charging mode auto-detection module 104 to enter into the BC 1.2 mode once the first control signal CTL1 is changed to the first logic state. The third control signal CTL3 is configured to control the charging mode auto-detection module 104 to enter into the SAMSUNG 1.2V/1.2V charging mode after the first control signal CTL1 has changed to the first logic state for a first delay time td1 (e.g. td1=1 s). The fourth control signal CTL4 is configured to control the charging mode auto-detection module 104 to detect whether the needing to be charged device is disconnected from the charging circuit 100 after the charging mode auto-detection module 104 entered into the SAMSUNG 1.2V/1.2V charging mode for a second delay time td2 (e.g. td2=1s). However, one of ordianary skill in the art would understand that this is not intended to be limiting. In an alternative embodiment, the charging mode auto-detection module 104 may detect whether the needing to be charged device is disconnected from the charging circuit 100 once it enters into the BC 1.2 mode (without any delay), the BC 1.2 mode control module 303 in this circumstance does not need to provide the forth control signal CTL4, but can use the second control signal CTL2 to trigger the charging mode auto-detection module 104 to detect whether the needing to be charged device is disconnected from the charging circuit 100 once the first control signal CTL1 is changed to the first logic state (indicating the charging mode auto-detection module 104 entered into the BC 1.2 mode). In an alternative embodiment, the charging mode auto-detection module 104 may detect whether the needing to be charged device is disconnected from the charging circuit 100 once it enters into the SAMSUNG 1.2V/1.2V charging mode (without any delay), the BC 1.2 mode control module 303 in this circumstance does not need to provide the fourth control signal CTL4, but can use the third control signal CTL3 to trigger the charging mode auto-detection module 104 to detect whether the needing to be charged device is disconnected from the charging circuit 100 after the first control signal CTL1 has changed to the first logic state for the first delay time td1 (indicating the charging mode auto-detection module 104 entered into the SAMSUNG 1.2V/1.2V charging mode).

In an embodiment, the second control signal CTL2 may also have a first logic state (e.g. logic high) and a second logic state (e.g. logic low). When the voltage dividing mode does not match the needing to be charged device, the BC 1.2 mode control module 303 may be configured to set the second control signal CTL2 to the first logic state once the first control signal CTL1 is changed to the first logic state, and otherwise to set the second control signal CTL2 to the second logic state. The second control signal CTL2 may be sent to the voltage dividing setting module 301 and may be configured to disconnect the voltage dividing setting module 301 from the data positive port DP and the data negative port DM once the second control signal changes to the first logic state (i.e. the voltage dividing mode does not match the needing to be charged device). For instance, in the example of FIG. 4, the second control signal CTL2 may control the first switch S1 and the second switch S2 to open so as to disconnect the voltage dividing setting module 301 from the data positive port DP and the data negative port DM once the second control signal changes to the first logic state. Consequently, the charging mode auto-detection module 104 exits the voltage dividing mode. The second control signal CTL2 may be sent to the voltage dividing mode determining module 302, and may be configured to disable the voltage dividing mode determining module 302 once the second control signal changes to the first logic state (i.e. the voltage dividing mode does not match the needing to be charged device). In this way, the voltage dividing mode detection and determination processes are completed and the charging mode auto-detection module 104 exits the voltage dividing mode.

In an embodiment, the third control signal CTL3 may also have a first logic state (e.g. logic high) and a second logic state (e.g. logic low). When the voltage dividing mode does not match the needing to be charged device, the BC 1.2 mode control module 303 may be configured to set the third control signal CTL3 to the first logic state once the first control signal CTL1 is changed to the first logic state or once the second control signal CTL2 has changed to the first logic state for the first delay time td1 (e.g. once the first delay time td1 has been timed since the second control signal CTL2 has changed to the first logic state), and otherwise to set the third control signal CTL3 to the second logic state. The third control signal CTL3 is configured to trigger the charging mode auto-detection module 104 to enter into the SAMSUNG 1.2V/1.2V charging mode at the first logic state.

In an embodiment, the fourth control signal CTL4 may also have a first logic state (e.g. logic high) and a second logic state (e.g. logic low). When the voltage dividing mode does not match the needing to be charged device, the BC 1.2 mode control module 303 may be configured to set the fourth control signal CTL4 to the first logic state once the third control signal CTL3 has changed to the first logic state for the second delay time td2 (e.g. once the second delay time td2 has been timed since third control signal CTL3 has changed to the first logic state), and otherwise to set the fourth control signal CTL4 to the second logic state. The fourth control signal CTL4 is configured to trigger the charging mode auto-detection module 104 to detect whether the needing to be charged device is disconnected from the charging circuit 100 at the first logic state. One of ordinary skill in the art would understand that in the embodiments where the charging mode auto-detection moudle 104 detects whether the needing to be charged device is disconnected from the charging circuit 100 immediately when it enters into the BC1.2 mode or the SAMSUNG 1.2V/1.2V charging mode, the BC 1.2 mode control module 303 may not generate or output the fourth control signal CTL4.

In the exemplary embodiment shown in FIG. 3, the BC 1.2 mode control module 303 may comprise an RS latch 3031, a first delay circuit 3032 and a second delay circuit 3033. The RS latch 3031 may be configured to receive the first control signal CTL1 at a latch setting input terminal S and to provide the second control signal CTL2 at a latch output terminal. The RS latch 3031 may further be configured to set the second control signal CTL2 to the first logic state in response to the first logic state of the first control signal and else to set the second control signal CTL2 to the second logic state. The first delay circuit 3032 may be configured to receive the second control signal CTL2 and to delay the second control signal CTL2 for a first delay time td1 (e.g. td1=1s) to output the third control signal CTL3. The second delay circuit 3033 may be configured to receive the third control signal CTL3 and to delay the fourth control signal CTL4. One of ordinary skill in the art would understand that in the embodiments where the charging mode auto-detection moudle 104 detects whether the needing to be charged device is disconnected from the charging circuit 100 immediately when it enters into the BC1.2 mode or the SAMSUNG 1.2V/1.2V charging mode, the BC 1.2 mode control module 303 may not comprise the second delay circuit 3033.

The BC 1.2 mode setting module 304 may be coupled between the data positive port DP and the data negative port DM, and may be configured to receive the second control signal CTL2. The BC 1.2 mode setting module 304 may further be configured to connect the data positive port DP to the data negative port DM when the second control signal CTL2 is at the first logic state (indicating that the charging mode auto-detection module 104 enters into the BC1.2 mode), and to disconnect the data positive port DP from the data negative port DM when the second control signal CTL2 is at the second logic state (indicating that the charging mode auto-detection module 104 exits the BC1.2 mode). When the data positive port DP is connected to the data negative port DM, the charging mode auto-detection module 104 enters into the BC1.2 mode. When the data positive port DP is disconnected from the data negative port DM, the charging mode auto-detection module 104 exits the BC1.2 mode. In the embodiment illustrated in FIG. 3, the BC1.2 mode setting module 304 may comprise a third controllable switch S3 and a third resistor R3 (e.g. having a resistance of 125Ω) coupled in series between the data positive port DP and the data negative port DM. The second control signal CTL2 may be sent to a control terminal of the third controllable switch S3 to close the third controllable switch S3 when the second control signal CTL2 is at the first logic state and to open the third controllable switch S3 when the second control signal CTL2 is at the second logic state.

The SAMSUNG 1.2V/1.2V charging mode setting module 305 may be coupled to the data negative port DM, to receive the third control signal CTL3, to connect the data negative port DM to a second predetermined voltage V2 (e.g.V2=1.2V) once the third control signal CTL3 is at the first logic state (indicating that the charging mode auto-detection module 104 enters into the SAMSUNG 1.2V/1.2V charging mode), and to disconnect the data negative port DM from the second predetermined voltage V2 once the third control signal CTL3 is at the second logic state (indicating that the charging mode auto-detection module 104 exits the SAMSUNG 1.2V/1.2V charging mode). When the data negative port DM is connected to the second predetermined voltage V2, the charging mode auto-detection module 104 enters into the SAMSUNG 1.2V/1.2V charging mode. When the data negative port DM is disconnected from the second predetermined voltage V2, the charging mode auto-detection module 104 exits the SAMSUNG 1.2V/1.2V charging mode. In the embodiment illustrated in FIG. 3, the SAMSUNG 1.2V/1.2V charging mode setting module 305 may comprise a fourth controllable switch S4, a fourth resistor R4 (e.g. having a resistance of 300 kΩ) and a second voltage source (also labled with V2) coupled in series between the data negative port and the reference ground GND. The second voltage source V2 provides the second predetermined voltage V2. The third control signal CTL3 may be sent to a control terminal of the fourth controllable switch S4 to close the fourth controllable switch S4 when the third control signal CTL3 is at the first logic state and to open the fourth controllable switch S4 when the third control signal CTL3 is at the second logic state.

Turning back to FIG. 2, in the BC1.2 mode or the SAMSUNG 1.2V/1.2V charging mode, further execute step 204, wherein the charging mode auto-detection module 104 detects and determines whether the BC1.2 mode or the SAMSUNG 1.2V/1.2V charging mode matches the needing to be charged device. If the BC1.2 mode or the SAMSUNG 1.2V/1.2V charging mode matches the needing to be charged device, the charging mode auto-detection module 104 remains in the BC1.2 mode or the SAMSUNG 1.2V/1.2V charging mode and repeats the above detection. Otherwise (the BC1.2 mode or the SAMSUNG 1.2V/1.2V charging mode does not match the needing to be charged device), the charging mode auto-detection module 104 exits the BC1.2 mode and the SAMSUNG 1.2V/1.2V charging mode, and pulls the negative data port voltage VDM to the reference ground GND. For this situation, the charging mode auto-detection module 104 is still executing the step 209, i.e. detecting whether the needing to be charged device is disconnected from the charging circuit 100. In accordance with an embodiment of the present invention, the charging mode auto-detection module 104 may be configured to determine whether the BC1.2 mode or the SAMSUNG 1.2V/1.2V charging mode matches the needing to be charged device by detecting whether the data positive port voltage VDP exceeds a BC1.2 mode threshold window ($V_{t2L}$, $V_{t2H}$). For instance, in an embodiment, the BC1.2 mode threshold window ($V_{t2L}$, $V_{t2H}$) can be set to (1.1V, 1.3V), i.e. $V_{t2L}$=1.1V, $V_{t2H}$=1.3V. If the data positive port voltage VDP exceeds the BC1.2 mode threshold window ($V_{t2L}$, $V_{t2H}$), the charging mode auto-detection module 104 determines that both the BC1.2 mode and the SAMSUNG 1.2V/1.2V charging mode do not match the needing to be charged device and exits the BC1.2 mode and the SAMSUNG 1.2V/1.2V charging mode. Otherwise, if the data positive port voltage VDP is within the BC1.2 mode threshold window ($V_{t2L}$, $V_{t2H}$), the charging mode auto-detection module 104 determines that the BC1.2 mode or the SAMSUNG 1.2V/1.2V charging mode matches the needing to be charged device and remains in the BC1.2 mode or the SAMSUNG 1.2V/1.2V charging mode. Meanwhile, the charging mode auto-detection module 104 is configured to send a corresponding indication signal Sref to the reference signal generation module 105 so that the charging circuit 100 can provide appropriate charging voltage to the needing to be charged device based on the indication signal Sref. In an embodiment, to prevent fault determination, when the data positive port voltage VDP exceeds the BC1.2 mode threshold window ($V_{t2L}$, $V_{t2H}$) for a second predetermined time t2 (e.g. 1 s~1.5s), the charging mode auto-detection module 104 determines that both the BC1.2 mode and the SAMSUNG 1.2V/1.2V charging mode do not match the needing to be charged device and exits the BC1.2 mode and the SAMSUNG 1.2V/1.2V charging mode.

In accordance with an embodiment of the present invention, referring to FIG. 3, the charging mode auto-detection module 104 may further comprise a BC1.2 mode determining module 306 coupled to the data positive port DP. The BC1.2 mode determining module 306 may be configured to detect and determine whether the data positive port voltage VDP exceeds the BC1.2 mode threshold window ($V_{t2L}$, $V_{t2H}$) to determine whether the BC1.2 mode or the SAMSUNG 1.2V/1.2V charging mode matches the needing to be charged device, and provide a fifth control signal CTL5 based on the determination results. In an embodiment, the fifth control signal CTL5 may have a first logic state (e.g. logic high) and a second logic state (e.g. logic low), wherein the fifth control signal CTL5 is at the first logic state when the BC1.2 mode and the SAMSUNG 1.2V/1.2V charging mode do not match the needing to be charged device, and is at the second logic state when the BC1.2 mode or the SAMSUNG 1.2V/1.2V charging mode matches the needing to be charged device. The BC1.2 mode determining module 306 may further have an enable input terminal configured to receive the second control signal CTL2, wherein the second control signal CTL2 is configured to enable the BC1.2 mode determining module 306 when the second control signal CTL2 is at the first logic state (indicating that the charging mode auto-detection module 104 enters into the BC1.2 mode), and otherwise (when the second control signal CTL2 is at the second logic state) to disable the BC1.2 mode determining module 306.

Figure 6:
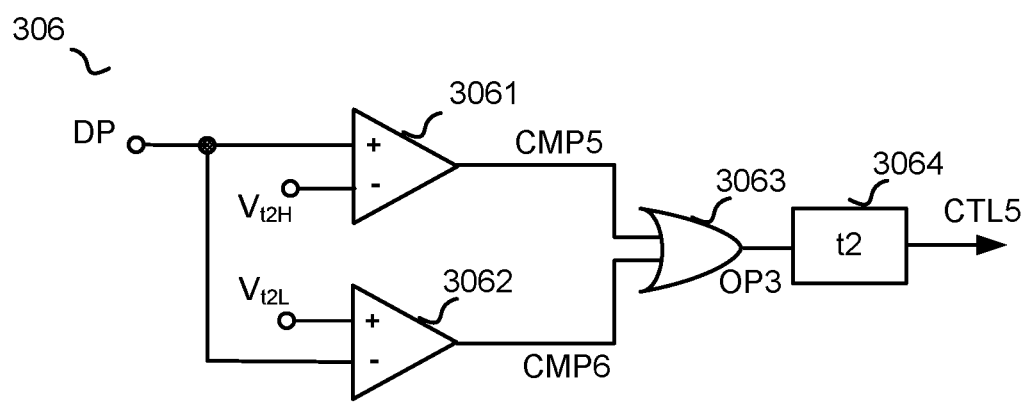
FIG. 6 illustrates a schematic diagram of a BC 1.2 mode determining module 306 with more details that can be used in the charging mode auto-detection module 104 of FIG. 3 in accordance with an embodiment of the present invention.

FIG. 6 illustrates a schematic diagram of a BC 1.2 mode determining module 306 with more details that can be used in the charging mode auto-detection module 104 of FIG. 3 in accordance with an embodiment of the present invention. In the exemplary embodiment of FIG. 6, the BC 1.2 mode determining module 306 may comprise: a fifth comparator 3061, a sixth comparator 3062, a third OR logic operation circuit 3063 and a third timing circuit 3064. The fifth comparator 3061 may have a first input terminal (e.g. the "+" input terminal of 3061 in FIG. 6) configured to receive the data positive port voltage VDP, a second input terminal (e.g. the "−" input terminal of 3061 in FIG. 6) configured to receive the high threshold $V_{t2H}$ of the BC1.2 mode threshold window ($V_{t2L}$, $V_{t2H}$), and an output terminal configured to output a fifth comparison signal CMP5. The sixth comparator 3062 may have a first input terminal (e.g. the "+" input terminal of 3062 in FIG. 6) configured to receive the low threshold $V_{t2L}$ of the BC1.2 mode threshold window ($V_{t2L}$, $V_{t2H}$), a second input terminal (e.g. the "−" input terminal of 3062 in FIG. 6) configured to receive the data positive port voltage VDP, and an output terminal configured to output a sixth comparison signal CMP6. The third OR logic operation circuit 3063 may be configured to receive the fifth comparison signal CMP5 and the sixth comparison signal CMP6, and to conduct OR logic operation to the fifth comparison signal CMP5 and the sixth comparison signal CMP6 to provide a third operation result OP3 so that the third operation result OP3 has a first logic state (e.g. logic high) when the data positive port voltage VDP is higher than the high threshold $V_{t2H}$ of the BC1.2 mode threshold window ($V_{t2L}$, $V_{t2H}$) or lower than the low threshold $V_{t2L}$ of the BC1.2 mode threshold window ($V_{t2L}$, $V_{t2H}$), else the third operation result OP3 has a second logic state (e.g. logic low). The third timing circuit 3064 may be configred to receive the third operation result OP3, to time duration of the first logic state of the third operation result OP3, and to provide the fifth control signal CTL5 based on the timing. If the duration of the first logic state of the third operation result OP3 reaches the second predetermined time t2, the fifth control signal CTL5 has the first logic state, else the fifth control signal CTL5 has the second logic state.

Turning back to FIG. 2, if the charging mode auto-detection module 104 determines that the BC1.2 mode and the SAMSUNG 1.2V/1.2V charging mode do not match the needing to be charged device, further excutes step 205: exiting the BC1.2 mode and the SAMSUNG 1.2V/1.2V charging mode, and pulling the data negative port voltage VDM to the reference ground GND. In an embodiment, referring to FIG. 3, the charging mode auto-detection module 104 may be configured to control the BC1.2 mode setting module 304 to disconnect the data positive port DP from the data negative port DM in response to the first logic state of the fifth control signal CTL5 to exit the BC1.2 mode, and thus exit the SAMSUNG 1.2V/1.2V charging mode too. In the embodiment where the BC1.2 mode setting module 304 comprises the third controllable switch S3 and the third resistor R3, the fifth control signal CTL5 may be sent to the control terminal of the third controllable switch S3 to open the third controllable switch S3 when the fifth control signal is at the first logic state, and thus disconnecting the data positive port DP from the data negative port DM. In an embodiment, still referring to FIG. 3, the charging mode auto-detection module 104 may further configured to control the SAMSUNG 1.2V/1.2V charging mode setting module 305 to disconnect the data negative port DM from the second predermined voltage V2 to save power consumption. In the embodiment where the SAMSUNG 1.2V/1.2V charging mode setting module 305 comprises the fourth fourth controllable switch S4, the fourth resistor R4 and the second voltage source V2, the fifth control signal CTL5 may be configured to open the fourth controllable switch S4 to disconnect the data negative port DM from the second predetermined voltage V2.

In accordance with an embodiment of the present invention, the charging mode auto-detection module 104 may further comprise a data negative port pull module 307. The data negative port pull module 307 may be coupled between the data negative port DM and the reference ground GND, and may be configured to receive the fifth control signal CTL5 and to pull the data negative port DM to the reference ground GND in response to the first logic state of the fifth control signal CTL5. In the example of FIG. 3, the data negative port pull module 307 is illustrated to comprise a fifth controllable switch S5 and a fifth resistor R5 coupled in series between the data negative port DM and the reference ground GND. The fifth control signal CTL5 may be sent to a control terminal of the fifth controllable switch S5 to close the fifth controllable switch S5 when the fifth control signal CTL5 is at the first logic state and to open the fifth controllable switch S5 when the fifth control signal CTL5 is at the second logic state.

Turning back to FIG. 2, after the charging mode auto-detection module 104 has pulled the data negative port voltage VDM to the reference ground, execute step 206: determining whether to enter into the QC3.0 mode. If the charging mode auto-detection module 104 needs to enter into the QC3.0 mode, it enters into the QC3.0 mode. Otherwise, it continues determining whether to enter into the QC3.0 mode. For this situation, the charging mode auto-detection module 104 is still executing the step 209, i.e. detecting whether the needing to be charged device is disconnected from the charging circuit 100. In accordance with an embodiment of the present invention, the charging mode auto-detection module 104 may be configured to determine whether to enter into the QC3.0 mode by detecting whether the data positive port voltage VDP is within a QC3.0 mode threshold window ($V_{t3L}$, $V_{t3H}$). For instance, in an embodiment, the QC3.0 mode threshold window ($V_{t3L}$, $V_{t3H}$) can be set to (0.3V, 1.1V), i.e. $V_{t3L}$=0.3V, $V_{t3H}$=1.1V. If the data positive port voltage VDP is within the QC3.0 mode threshold window ($V_{t3L}$, $V_{t3H}$), the charging mode auto-detection module 104 determines that it needs to enter into the QC3.0 mode. Otherwise, if the data positive port voltage VDP exceeds the QC3.0 mode threshold window ($V_{t3L}$, $V_{t3H}$), the charging mode auto-detection module 104 determines that it does not need to enter into the QC3.0 mode and continues with the determining of whether to enter into the QC3.0 mode.

In accordance with an embodiment of the present invention, referring to FIG. 3, the charging mode auto-detection module 104 may further comprise a QC3.0 mode detecting module 308. The QC3.0 mode detecting module 308 may be coupled to the data positive port DP and may be configured to detect whether the data positive port voltage VDP is within the QC3.0 mode threshold window ($V_{t3L}$, $V_{t3H}$) to provide a sixth control signal CTL6 based on the detecting result. In an embodiment, the sixth control signal CTL6 may have a first logic state (e.g. logic high) and a second logic state (e.g. logic low). When the data positive port voltage VDP is within the QC3.0 mode threshold window ($V_{t3L}$, $V_{t3H}$), which indicates that the charging mode auto-detection module 104 needs to enter into the QC3.0 mode, the sixth control signal CTL6 has the first logic state. When the data positive port voltage VDP exceeds the QC3.0 mode threshold window ($V_{t3L}$, $V_{t3H}$), which indicates that the charging mode auto-detection module 104 does not nee to enter into the QC3.0 mode, the sixth control signal CTL6 has the second logic state. The QC3.0 mode detecting module 308 may further have an enable input terminal configured to receive the fifth control signal CTL5, wherein the fifth control signal CTL5 is configured to enable the QC3.0 mode detecting module 308 when the fifth control signal CTL5 is at the first logic state (indicating that the BC1.2 mode and the SAMSUNG 1.2V/1.2V charging mode do not match the needing to be charged device), and otherwise (when the fifth control signal CTL5 is at the second logic state) to disable the QC3.0 mode detecting module 308.

Figure 7:
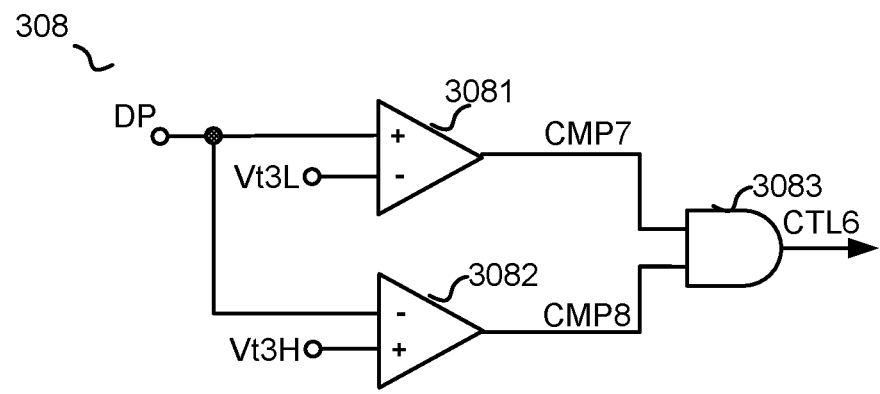
FIG. 7 illustrates a schematic diagram of a QC 3.0 mode detection module 308 with more details that can be used in the charging mode auto-detection module 104 of FIG. 3 in accordance with an embodiment of the present invention.

FIG. 7 illustrates a schematic diagram of a QC 3.0 mode detection module 308 with more details that can be used in the charging mode auto-detection module 104 of FIG. 3 in accordance with an embodiment of the present invention. In the exemplary embodiment of FIG. 7, the QC 3.0 mode detection module 308 may comprise: a seventh comparator 3081, an eighth comparator 3082, and a first AND logic operation circuit 3083. The seventh comparator 3081 may have a first input terminal (e.g. the "+" input terminal of 3081 in FIG. 7) configured to receive the data positive port voltage VDP, a second input terminal (e.g. the "−" input terminal of 3081 in FIG. 7) configured to receive the low threshold $V_{t3L}$ of the QC3.0 mode threshold window ($V_{t3L}$, $V_{t3H}$), and an output terminal configured to output a seventh comparison signal CMP7. The eighth comparator 3082 may have a first input terminal (e.g. the "+" input terminal of 3082 in FIG. 7) configured to receive the high threshold $V_{t3H}$ of the QC3.0 mode threshold window ($V_{t3L}$, $V_{t3H}$), a second input terminal (e.g. the "−" input terminal of 3082 in FIG. 7) configured to receive the data positive port voltage VDP, and an output terminal configured to output an eighth comparison signal CMP8. The first AND logic operation circuit 3083 may be configured to receive the seventh comparison signal CMP7 and the eighth comparison signal CMP8, and to conduct AND logic operation to the seventh comparison signal CMP7 and the eighth comparison signal CMP8 to provide a sixth control signal CTL6 so that the sixth control signal CTL6 has a first logic state (e.g. logic high) when the data positive port voltage VDP is higher than the low threshold $V_{t3L}$ of the QC3.0 mode threshold window ($V_{t3L}$, $V_{t3H}$) or lower than the high threshold $V_{t3H}$ of the QC3.0 mode threshold window ($V_{t3L}$, $V_{t3H}$), else the sixth control signal CTL6 has a second logic state (e.g. logic low).

Turning back to FIG. 2, if the charging mode auto-detection module 104 determines that it needs to enter into the QC3.0 mode, excutes step 207: entering into the QC3.0 mode. In the QC3.0 mode, the charging mode auto-detection module 104 may be configured to detect a plurality of data positive port voltage and data negative port voltage combinations provided by the needing to be charged device to the data positive port DP and to the data negative port DM. Corresponding to each corresponding one of the plurality of data positive port voltage and data negative port voltage combinations, the charging mode auto-detection module 104 may be configured to provide a corresponding indication signal Sref to the reference signal generation module 105. The reference signal generation module 105 may be configured to provide a corresponnding reference signal Vref based on the corresponding indication signal Sref. Referring to FIG. 1, based on the corresponding reference signal Vref, the charging circuit 100 may be configured to regulate the bus voltage $V_{BUS}$ (e.g. through the power supply regulation module 107) to a corresponding bus voltage value. That is to say, in the QC3.0 mode, corresponding to each corresponding one of the plurality of data positive port voltage VDP and data negative port voltage VDM combinations, the charging circuit 100 can regulate the bus voltage $V_{BUS}$ to a corresponding bus voltage value. For instance, in an embodiment, in the QC3.0 mode, the needing to be charged device may provide 5 data positive port voltage VDP and data negative port voltage VDM combinations, e.g. (VDP, VDM)={(0.6V, 0.6V), (3.3V, 0.6V), (3.3V, 3.3V), (0.6V, GND), (0.6V, 3.3V)}. Corresponding to the data positive port voltage VDP and data negative port voltage VDM combination of (0.6V, 0.6V), the charging circuit 100 can regulate the bus voltage $V_{BUS}$ to a corresponding bus voltage value of 12V. Corresponding to the data positive port voltage VDP and data negative port voltage VDM combination of (3.3V, 0.6V), the charging circuit 100 can regulate the bus voltage $V_{BUS}$ to a corresponding bus voltage value of 9V. Corresponding to the data positive port voltage VDP and data negative port voltage VDM combination of (3.3V, 3.3V), the charging circuit 100 can regulate the bus voltage $V_{BUS}$ to a corresponding bus voltage value of 20V. Corresponding to the data positive port voltage VDP and data negative port voltage VDM combination of (0.6V, GND), the charging circuit 100 can regulate the bus voltage $V_{BUS}$ to a corresponding bus voltage value of 5V. Corresponding to the data positive port voltage VDP and data negative port voltage VDM combination of (0.6V, 3.3V), the charging mode auto-detection module 104 may be further configured to detect pulses of the data positive port voltage VDP and pulses of the data negative port voltage VDM. The charging circuit 100 is configured to regulate the bus voltage $V_{BUS}$ to increase with a predetermined magnitude (e.g. 200 mV) in response to each rising edge of the pulses of the data positive port voltage VDP, and is further configured to regulate the bus voltage $V_{BUS}$ to decrease with the predetermined magnitude (e.g. 200 mV) in response to each falling edge of the pulses of the data negative port voltage VDM.

In accordance with an embodiment of the present invention, referring to FIG. 3, the charing mode auto-detection module 104 may further comprise a QC3.0 mode setting module 309. The QC3.0 mode setting module 309 is coupled to the data positive port DP and the data negative port DM, and may be configured to detect the plurality of data positive port voltage VDP and data negative port voltage VDM combinations and to provide a corresponding indication signal Sref in response to each corresponding one of the plurality of data positive port voltage VDP and data negative port voltage VDM combinations. The corresponding indication signal Sref corresponded to each corresponding one of the plurality of data positive port voltage VDP and data negative port voltage VDM combinations is sent to the reference signal generation module 105, so that the charging circuit 100 can regulate the bus voltage $V_{BUS}$ to a corresponding bus voltage value corresponding to each corresponding one of the plurality of data positive port voltage VDP and data negative port voltage VDM combinations. In the example embodiment shown in FIG. 3, the QC3.0 mode setting module 309 is illustrated to detect 5 data positive port voltage VDP and data negative port voltage VDM combinations, e.g. (VDP, VDM)={(0.6V, 0.6V), (3.3V, 0.6V), (3.3V, 3.3V), (0.6V, GND), (0.6V, 3.3V)}, and to provide a corresponding indication signal in correspondace to each of the (0.6V, 0.6V), (3.3V, 0.6V), (3.3V, 3.3V), (0.6V, GND), (0.6V, 3.3V) data positive port voltage VDP and data negative port voltage VDM combinations, so that the charging circuit 100 can regulate the bus voltage $V_{BUS}$ to a corresponding bus voltage value corresponding to each of the (0.6V, 0.6V), (3.3V, 0.6V), (3.3V, 3.3V), (0.6V, GND), (0.6V, 3.3V) data positive port voltage VDP and data negative port voltage VDM combinations. For instance, the charging circuit 100 may be configured to regulate the bus voltage $V_{BUS}$ to respectively 12V, 9V, 20V and 5V respectively corresponding to the (0.6V, 0.6V), (3.3V, 0.6V), (3.3V, 3.3V), (0.6V, GND) combinations. For the (0.6V, 3.3V) combination, the QC3.0 mode setting module 309 may be configured to provide a seventh control signal CTL7. The seventh control signal CTL7 is configured to control the QC3.0 mode setting module 309 to detect pulses of the data positive port voltage VDP and pulses of the data negative port voltage VDM. The charging circuit 100 is configured to regulate the bus voltage $V_{BUS}$ to increase with a predetermined magnitude (e.g. 200 mV) in response to each rising edge of the pulses of the data positive port voltage VDP, and is further configured to regulate the bus voltage $V_{BUS}$ to decrease with the predetermined magnitude (e.g. 200 mV) in response to each falling edge of the pulses of the data negative port voltage VDM. The QC3.0 mode setting module 309 may further have an enable input terminal configured to receive the sixth control signal CTL6, wherein the sixth control signal CTL6 is configured to enable the QC3.0 mode setting module 309 when the sixth control signal CTL6 is at the first logic state (indicating that the charging mode auto-detection module 104 needs to enter into the QC3.0 mode), and otherwise (when the sixth control signal CTL6 is at the second logic state) to disable the QC3.0 mode setting module 309.

Turning back to FIG. 2, after entering into the QC3.0 mode, the charging mode auto-detection module 104 may further execute step 208: determining whether the QC3.0 mode matches the needing to be charged device. If the QC3.0 mode matches the needing to be charged device, the charging mode auto-detection module 104 remains in the QC3.0 mode and repeats the above detection. Otherwise (the QC3.0 mode does not match the needing to be charged device), the charging mode auto-detection module 104 exits the QC3.0 mode, and the charging mode auto-detection module 104 and all the sub-modules (e.g. the voltage dividing mode setting module 301, the BC1.2 mode control module 303, the BC1.2 mode determining module 306, the QC3.0 mode detecting module 308 and the QC3.0 mode setting module 309) it includes are reset (recovered to the initial status), returning to the step 201. In accordance with an embodiment of the present invention, the charging mode auto-detection module 104 may be configured to determine whether the QC3.0 mode matches the needing to be charged device by detecting whether the data positive port voltage VDP is lower than a QC3.0 mode threshold $V_{t3}$ (e.g. $V_{t3}$=0.3V). If the data positive port voltage VDP is lower than the QC3.0 mode threshold $V_{t3}$, the charging mode auto-detection module 104 determines that the QC3.0 mode does not match the needing to be charged device and exits the QC3.0 mode. Otherwise, if the data positive port voltage VDP is higher than the QC3.0 mode threshold $V_{t3}$, the charging mode auto-detection module 104 determines that the QC3.0 mode matches the needing to be charged device and remains in the QC3.0 mode. In an embodiment, to prevent fault determination, when the data positive port voltage VDP is lower than the QC3.0 mode threshold $V_{t3}$ for a third predetermined time t3 (e.g. 20 ms), the charging mode auto-detection module 104 determines that the QC3.0 mode does not match the needing to be charged device and exits the QC3.0 mode.

In accordance with an embodiment of the present invention, referring to FIG. 3, the charging mode auto-detection module 104 may further comprise a QC3.0 mode determining module 310. The QC3.0 mode determining module 310 may be coupled to the data positive port DP and configured to detect and determine whether the data positive port voltage VDP is lower than the QC3.0 mode threshold $V_{t3}$ to determine whether the QC3.0 mode matches the needing to be charged device, and provide an eighth control signal CTL8 based on the determination results. In an embodiment, the eighth control signal CTL8 may have a first logic state (e.g. logic high) and a second logic state (e.g. logic low), wherein the eighth control signal CTL8 is at the first logic state when the QC3.0 mode does not match the needing to be charged device, and is at the second logic state when the QC3.0 mode matches the needing to be charged device. The eighth control signal CTL8 may be configured to reset the charging mode auto-detection module 104 and all the sub-modules (e.g. the voltage dividing mode setting module 301, the BC1.2 mode control module 303, the BC1.2 mode determining module 306, the QC3.0 mode detecting module 308 and the QC3.0 mode setting module 309) it includes when the eighth control signal CTL8 is at the first logic state. The QC3.0 mode determining module 310 may further have an enable input terminal configured to receive the sixth control signal CTL6, wherein the sixth control signal CTL6 is configured to enable the QC3.0 mode determining module 310 when the sixth control signal CTL6 is at the first logic state (indicating that the charging mode auto-detection module 104 enters into the QC3.0 mode), and otherwise (when the sixth control signal CTL6 is at the second logic state) to disable the QC3.0 mode determining module 310.

In accordance with an embodiment of the present invention, the QC3.0 mode determining module 310 may comprise a QC3.0 mode determination comparator 3101 and a QC3.0 mode determination timing circuit 3102. The QC3.0 mode determination comparator 3101 may have a first input terminal (e.g. the "−" input terminal of 3101 in FIG. 3) configured to receive the data positive port voltage VDP, a second input terminal (e.g. the "+" input terminal of 3101 in FIG. 3) configured to receive the QC3.0 mode threshold $V_{t3}$, and an output terminal configured to output QC3.0 mode determination signal JD. If the data positive port voltage VDP is lower than the QC3.0 mode threshold $V_{t3}$, the QC3.0 mode determination signal JD has a first logic state (e.g. logic high), otherwise, if the data positive port voltage VDP is higher than the QC3.0 mode threshold $V_{t3}$, the QC3.0 mode determination signal JD has a second logic state (e.g. logic low). The QC3.0 mode determination timing circuit 3102 may be configured to receive the QC3.0 mode determination signal JD, to time duration of the first logic state of the QC3.0 mode determination signal JD, and to provide the eighth control signal CTL8 based on the timing. If the duration of the first logic state of the QC3.0 mode determination signal JD reaches the third predetermined time t3, the eighth control signal CTL8 has the first logic state, else the eighth control signal CTL8 has the second logic state. In an embodiment, the QC3.0 mode determination comparator 3101 and the QC3.0 mode determination timing circuit 3102 may each have an enable input terminal configured to receive the sixth control signal CTL6, wherein the sixth control signal CTL6 may be configured to enable the QC3.0 mode determination comparator 3101 and the QC3.0 mode determination timing circuit 3102 at the first logic state and to disable the QC3.0 mode determination comparator 3101 and the QC3.0 mode determination timing circuit 3102 at the second logic state.

Turning back to FIG. 2, in the QC3.0 mode, the charging mode auto-detection module 104 is still executing the step 209, i.e. detecting whether the needing to be charged device is disconnected from the charging circuit 100.

In accordance with an embodiment of the present invention, as can be seen from FIG. 2, since entering into the BC1.2 mode (step 203), the charging mode auto-detection module 104 is executing the step 209 in the step 203 and all the subsequent steps (e.g. from step 203 to step 207), detecting whether the needing to be charged device is disconnected from the charging circuit 100. If the needing to be charged device is disconnected from the charging circuit 100, the charging mode auto-detection module 104 and all the sub-modules (e.g. the voltage dividing mode setting module 301, the BC1.2 mode control module 303, the BC1.2 mode determining module 306, the QC3.0 mode detecting module 308 and the QC3.0 mode setting module 309) it includes are reset (recovered to the initial status), returning to the step 201.

In accordance with an embodiment of the present invention, the charging mode auto-detection module 104 may further comprise a disconnection detection module 311. The disconnection detection module 311 may be coupled to the data negative port DM. The disconnection detection module 311 may be configured to couple the data negative port DM to a third predetermined voltage V3 (e.g. V3=2.3V) through a high resistance element R6 in response to the first logic state of the fourth control signal CTL4 (i.e. when the charging mode auto-detection module 104 has entered into the SAMSUNG 1.2V/1.2V charging mode for the second delay time td2), to detect whether the data negative port voltage VDM is within a predetermined detection threshold window ($V_{t4L}$, $V_{t4H}$) to determine whether the needing to be charged device is disconnected from the charging circuit 100, and to provide a ninth control signal CTL9 based on the determination results. In an embodiment, the high resistance element R6 may have a resistance much higher than any other resistive elements (e.g. the third resistor R3, the fourth resistor R4, and the fifth resistor R5) of the charging mode auto-detection module 104. For instance, in an embodiment, the high resistance element R6 may have a resistance of 1MΩ. For this situation, while the third predetermined voltage V3 is coupled to the data negative port DM through the high resistance element R6, the third predetermined voltage V3 may not prevent other sub-modules (e.g. the BC1.2 mode setting module 304, the SAMSUNG 1.2V/1.2V charging mode setting module 305, the data negative port pul module 307, the QC3.0 mode setting module 309 etc.) of the charging mode auto-detection module 104 to set or couple the data negative port voltage VDM to other voltage values, and thus may not affect the functions of other sub-modules. In an embodiment, the predetermined detection threshold window ($V_{t4L}$, $V_{t4H}$) may be set to (2.2V, 2.4V), i.e. $V_{t4L}$=2.2V, $V_{t4H}$=2.4V. If the data negative port voltage VDM is within the predetermined detection threshold window ($V_{t4L}$, $V_{t4H}$), the disconnection detection module 311 determines that the needing to be charged device is disconnected from the charging circuit 100, and the ninth control signal has the first logic state. Otherwise, if the data negative port voltage VDM exceeds the predetermined detection threshold window ($V_{t4L}$, $V_{t4H}$), the disconnection detection module 311 determines that the needing to be charged device is still connected to the charging circuit 100, and the ninth control signal CTL9 has the second logic state. The ninth control signal CTL9 is configured to reset the charging mode auto-detection module 104 and all the sub-modules (e.g. the voltage dividing mode setting module 301, the BC1.2 mode control module 303, the BC1.2 mode determining module 306, the QC3.0 mode detecting module 308 and the QC3.0 mode setting module 309) it includes when the ninth control signal CTL9 is at the first logic state. In an embodiment, to prevent fault determination, when the data negative port voltage VDM is within the predetermined detection threshold window ($V_{t4L}$, $V_{t4H}$) for a fourth predetermined time t4 (e.g. 1s), the disconnection detection module 311 determines that the needing to be charged device is disconnected from the charging circuit 100. In an embodiment, the disconnection detection module 311 may further have an enable input terminal configured to receive the fourth control signal CTL4, wherein the fourth control signal CTL4 is configured to enable the disconnection detection module 311 at the first logic state (indicating the charging mode auto-detection module 104 enters into the BC1.2 mode), and otherwise to disable the disconnection detection module 311.

Figure 8:
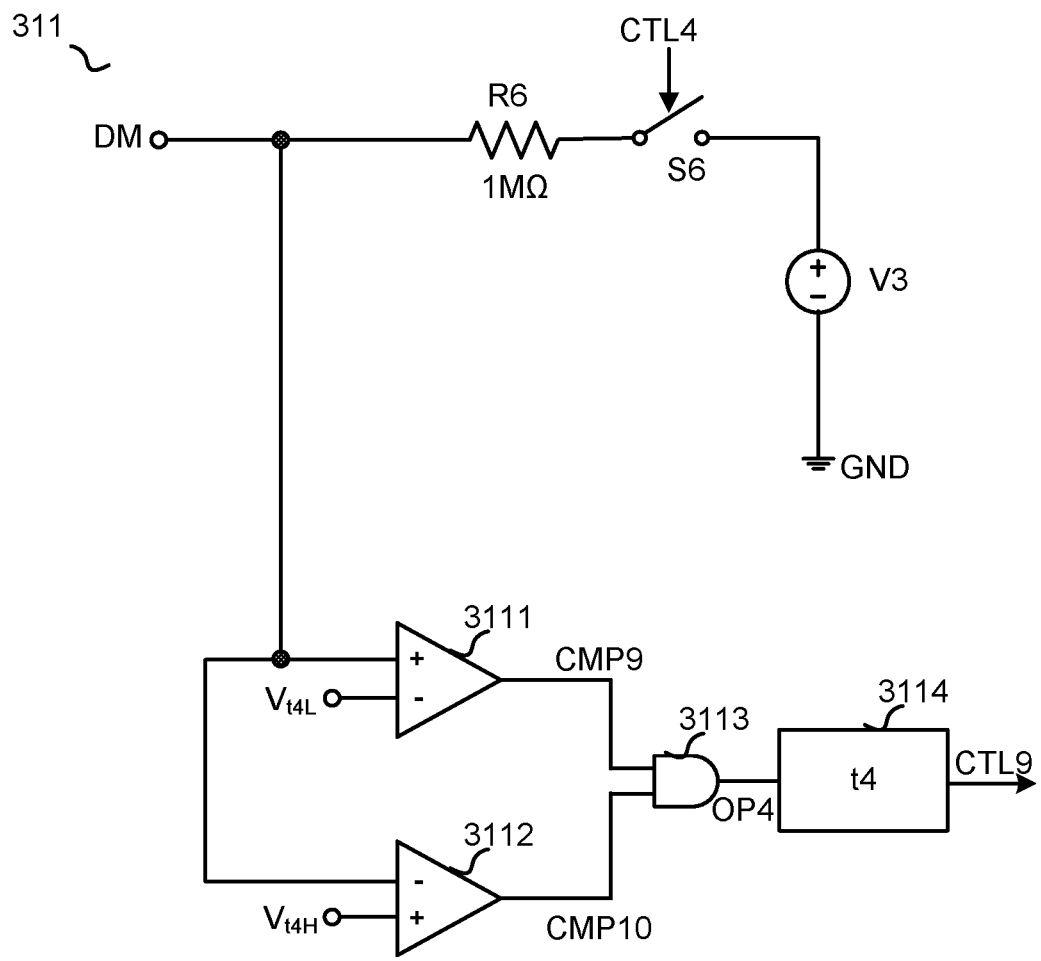
FIG. 8 illustrates a schematic diagram of a disconnection detection module 311 with more details that can be used in the charging mode auto-detection module 104 of FIG. 3 in accordance with an embodiment of the present invention.

FIG. 8 illustrates a schematic diagram of a disconnection detection module 311 with more details that can be used in the charging mode auto-detection module 104 of FIG. 3 in accordance with an embodiment of the present invention. In the example of FIG. 8, the disconnection detection module 311 may comprise: a ninth comparator 3111, a tenth comparator 3112, a second AND logic operation circuit 3113, a fourth timing circuit 3114, the high resistance element R6, a sixth controllable switch S6 and a third voltage source V3. The high resistance element R6, the sixth controllable switch S6 and the third voltage source V3 are successively connected in series between the data negative port DM and the reference ground GND. The third voltage source V3 is configured to provide the third predetermined voltage V3 (e.g. 2.3V). The fourth control signal CTL4 may be sent to a control terminal of the sixth controllable swtich S6, and may be configured to close the sixth controllable swtich S6 when the fourth control signal CTL4 is at the first logic state, and to open the sixth controllable swtich S6 when the fourth control signal CTL4 is at the second logic state. The ninth comparator 3111 may have a first input terminal (e.g. the "+" input terminal of 3111 in FIG. 8) configured to receive the data negative port voltage VDM, a second input terminal (e.g. the "−" input terminal of 3111 in FIG. 8) configured to receive the low threshold $V_{t4L}$ of the predetermined detection threshold window ($V_{t4L}$, $V_{t4H}$), and an output terminal configured to output a ninth comparison signal CMP9. The tenth comparator 3112 may have a first input terminal (e.g. the "+" input terminal of 3112 in FIG. 8) configured to receive the high threshold $V_{t4H}$ of the predetermined detection threshold window ($V_{t4L}$, $V_{t4H}$), a second input terminal (e.g. the "−" input terminal of 3112 in FIG. 8) configured to receive the data negative port voltage VDM, and an output terminal configured to output a tenth comparison signal CMP10. The second AND logic operation circuit 3113 may be configured to receive the ninth comparison signal CMP9 and the tenth comparison signal CMP10, and to conduct AND logic operation to the ninth comparison signal CMP9 and the tenth comparison signal CMP10 to provide a fourth operation result OP4 so that the fourth operation result OP4 has a first logic state (e.g. logic high) when the data negative port voltage VDM is higher than the low threshold $V_{t4L}$ of the predetermined detection threshold window ($V_{t4L}$, $V_{t4H}$) and lower than the high threshold $V_{t4H}$ of the predetermined detection threshold window ($V_{t4L}$, $V_{t4H}$), else the fourth operation result OP4 has a second logic state (e.g. logic low). The fourth timing circuit 3114 may be configured to receive the fourth operation result OP4, to time duration of the first logic state of the fourth operation result OP4, and to provide the ninth control signal CTL9 based on the timing. If the duration of the first logic state of the fourth operation result OP4 reaches the fourth predetermined time t4, the ninth control signal CTL9 has the first logic state, else the ninth control signal CTL9 has the second logic state.

The above descriptions to the charging circuit 100 and the charging mode auto-detection module 104 according to various embodiments of the present invention are exemplary and not intended to be limiting. One of ordinary skill in the art should understand that various modifications and variations can be made. The charging circuit 100, the charging mode auto-detection module 104 and the charging mode auto-detection method in accordance with various embodiments of the present invention compatibly include the voltage dividing charging mode, BC 1.2 dedicated charging port ("DCP") mode, SAMSUNG 1.2V/1.2V charging mode and Quick Charging ("QC") 3.0 mode, and can auto-detect which of the charging modes is adaptable to the needing to be charged device connected to the charging ircuit 100 through detecting the data positive port voltage VDP and the data negative port voltage VDM, and automatically match the adaptable charging mode with the needing to be charged device to provide an appropriate bus voltage $V_{BUS}$ to charge the needing to be charged device. The charging mode auto-detection module 104 and the charging mode auto-detection method in accordance with various embodiments of the present invention advantageously provide compatible mainstream charging modes and enhance the charging convenience, charging speed and charging safety.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A charging mode auto-detection module for a charging circuit, comprising:
   a voltage dividing mode determining module, configured to detect whether a data positive port voltage at a data positive port of the charging circuit exceeds a voltage dividing mode threshold window or a data negative port voltage at a data negative port of the charging circuit exceeds the voltage dividing mode threshold window to determine whether a voltage dividing charging mode matches a needing to be charged device, wherein when both the data positive port voltage and the data negative port voltage are within the voltage dividing mode threshold window, the voltage dividing mode determining module determines that the voltage dividing charging mode matches the needing to be charged device and the charging mode auto-detection module remains in the voltage dividing charging mode, and wherein when either the data positive port voltage or the data negative port voltage exceeds the voltage dividing mode threshold window, the voltage dividing mode determining module determines that the voltage dividing charging mode does not match the needing to be charged device, and the charging mode auto-detection module exits the voltage dividing charging mode and enters into a BC1.2 mode;

a BC1.2 mode determining module, configured to detect whether the data positive port voltage exceeds a BC1.2 mode threshold window to determine whether a BC1.2 mode or a SAMSUNG 1.2V/1.2V charging mode matches the needing to be charged device, wherein when the data positive port voltage is within the BC1.2 mode threshold window, the BC1.2 mode determining module determines that the BC1.2 mode or the SAMSUNG 1.2V/1.2V charging mode matches the needing to be charged device and the charging mode auto-detection module remains in the BC1.2 mode or the SAMSUNG 1.2V/1.2V charging mode, and wherein when the data positive port voltage exceeds the BC1.2 mode threshold window, the BC1.2 mode determining module determines that both the BC1.2 mode and the SAMSUNG 1.2V/1.2V charging mode do not match the needing to be charged device, and the charging mode auto-detection module is configured to exit the BC1.2 mode and the SAMSUNG 1.2V/1.2V charging mode and to pull the data negative port voltage to a reference ground; and a QC3.0 mode detecting module, configured to detect whether the data positive port voltage is within a QC3.0 mode threshold window to determine whether the charging mode auto-detection module enters into the QC3.0 mode, wherein when the data positive port voltage is within the QC3.0 mode threshold window, the QC3.0 mode detecting module determines that the charging mode auto-detection module needs to enter into the QC3.0 mode, and wherein when the data positive port voltage exceeds the QC3.0 mode threshold window, the QC3.0 mode detecting module determines that the charging mode auto-detection module does not need to enter into the QC3.0 mode.

2. The charging mode auto-detection module of claim 1, wherein:
the voltage dividing mode determining module is configured to determine that the voltage dividing charging mode does not match the needing to be charged device when the data positive port voltage exceeds the voltage dividing mode threshold window for a predetermined time designed for the voltage dividing mode or the data negative port voltage exceeds the voltage dividing mode threshold window for the predetermined time designed for the voltage dividing mode.

3. The charging mode auto-detection module of claim 1, wherein:
the BC1.2 mode determining module is configured to determine that both the BC1.2 mode and the SAMSUNG 1.2V/1.2V charging mode do not match the needing to be charged device when the data positive port voltage exceeds the BC1.2 mode threshold window for a predetermined time designed for the BC1.2 mode.

4. The charging mode auto-detection module of claim 1, further comprising:
a voltage dividing mode setting module, configured to couple the data positive port and the data negative port to a first predetermined voltage when the charging mode auto-detection module is in the voltage dividing charging mode, and to disconnect the data positive port and the data negative port from the first predetermined voltage when the charging mode auto-detection module exits the voltage dividing charging mode.

5. The charging mode auto-detection module of claim 1, wherein:
the voltage dividing mode determining module is configured to provide a first control signal having a first logic state when the voltage dividing charging mode does not match the needing to be charged device and having a second logic state when the voltage dividing charging mode matches the needing to be charged device; and wherein
the charging mode auto-detection module further comprises a BC1.2 mode control module configured to receive the first control signal and to generate a second control signal and a third control signal based on the first control signal, wherein the second control signal is configured to disable the voltage dividing mode determining module and to control the charging mode auto-detection module to enter into the BC1.2 mode once the first control signal is changed to the first logic state, and wherein the third control signal is configured to control the charging mode auto-detection module to enter into the SAMSUNG 1.2V/1.2V charging mode after the first control signal has changed to the first logic state for a first delay time.

6. The charging mode auto-detection module of claim 5, wherein the second control signal is further configured to trigger the charging mode auto-detection module to detect whether the needing to be charged device is disconnected from the charging circuit once the first control signal is changed to the first logic state or once the first control signal has changed to the first logic state for the first delay time.

7. The charging mode auto-detection module of claim 5, wherein the BC1.2 mode control module is further configured to generate a fourth control signal based on the first control signal, and wherein the fourth control signal is configured to control the charging mode auto-detection module to detect whether the needing to be charged device is disconnected from the charging circuit after the charging mode auto-detection module entered into the SAMSUNG 1.2V/1.2V charging mode for a second delay time.

8. The charging mode auto-detection module of claim 5, wherein:
the BC1.2 mode control module is configured to set the second control signal to a first logic state once the first control signal is changed to the first logic state, and otherwise to set the second control signal to a second logic state; and wherein
the BC1.2 mode determining module is configured to provide a BC1.2 mode matching indication signal having a first logic state when the BC1.2 mode and the SAMSUNG 1.2V/1.2V charging mode do not match the needing to be charged device and having a second logic state when the BC1.2 mode or the SAMSUNG 1.2V/1.2V charging mode matches the needing to be charged device; and wherein the charging mode auto-detection module further comprises:
a BC1.2 mode setting module coupled between the data positive port and the data negative port, configured to receive the second control signal and the BC 1.2 mode matching indication signal, to connect the data positive port to the data negative port when the second control signal is at the first logic state, and to disconnect the data positive port from the data negative port when the second control signal is at the second logic state or the BC1.2 mode matching indication signal is at the first logic state.

9. The charging mode auto-detection module of claim 8, wherein:
the BC 1.2 mode control module is further configured to set the third control signal to a first logic state when the first logic state of the first control signal or the second control signal has lasted for the first delay time and otherwise to set the third control signal to a second logic state; and wherein
the charging mode auto-detection module further comprises:
a SAMSUNG 1.2V/1.2V charging mode setting module coupled to the data negative port and configured to receive the third control signal and the BC 1.2 mode matching indication signal, to connect the data negative port to a second predetermined voltage once the third control signal is at the first logic state, and to disconnect the data negative port from the second predetermined voltage once the third control signal or the BC 1.2 mode matching indication signal is at the second logic state.

10. The charging mode auto-detection module of claim 5, further comprising:
a QC3.0 mode setting module, coupled to the data positive port and the data negative port, and configured to detect a plurality of data positive port voltage and data negative port voltage combinations to provide a corresponding indication signal in response to each corresponding one of the plurality of data positive port voltage and data negative port voltage combinations so that the charging circuit is configured to regulate a bus voltage provided to the needing to be charged device to a corresponding bus voltage value.

11. The charging mode auto-detection module of claim 5, further comprising:
a QC3.0 mode determining module coupled to the data positive port and configured to detect whether the data positive port voltage is lower than a QC3.0 mode threshold to determine whether the QC3.0 mode matches the needing to be charged device, wherein when the data positive port voltage is higher than the QC3.0 mode threshold, the QC3.0 mode determining module determines that the QC3.0 mode matches the needing to be charged device and is configured to control the charging mode auto-detection module to remain in the QC3.0 mode, and wherein when the data positive port voltage is lower than the QC3.0 mode threshold, the QC3.0 mode determining module determines that the QC3.0 mode does not match the needing to be charged device and is configured to control the charging mode auto-detection module to exit the QC3.0 mode and to reset the charging mode auto-detection module and all the sub-modules it includes.

12. The charging mode auto-detection module of claim 11, wherein:

the QC3.0 mode determining module is configured to determine that the QC3.0 mode does not match the needing to be charged device when the data positive port voltage is lower than the QC3.0 mode threshold for a predetermined time designed for the QC3.0 mode.

13. The charging mode auto-detection module of claim 5, further comprising:
a disconnection detection module, coupled to the data negative port, and configured to couple the data negative port to a third predetermined voltage through a high resistance element and to detect whether the data negative port voltage is within a predetermined detection threshold window when the charging mode auto-detection module enters into the BC1.2 mode or the SAMSUNG 1.2V/1.2V charging mode or when the charging mode auto-detection module has entered into the SAMSUNG 1.2V/1.2V charging mode for a second delay time; wherein
when the data negative port voltage is within the predetermined detection threshold window, the disconnection detection module determines that the needing to be charged device is disconnected from the charging circuit and is configured to reset the charging mode auto-detection module and all the sub-modules it includes; and wherein
when the data negative port voltage exceeds the predetermined detection threshold window, the disconnection detection module determines that the needing to be charged device is still connected to the charging circuit.

14. The charging mode auto-detection module of claim 1, further comprising:
a data negative port pull module, coupled between the data negative port and the reference ground, and configured to connect the data negative port to the reference ground when both the BC1.2 mode and the SAMSUNG 1.2V/1.2V charging mode do not match the needing to be charged device, and to disconnect the data negative port from the reference ground when the BC1.2 mode or the SAMSUNG 1.2V/1.2V charging mode matches the needing to be charged device.

15. The charging mode auto-detection module of claim 1, further comprising:
a QC3.0 mode setting module, coupled to the data positive port and the data negative port, and configured to detect a plurality of data positive port voltage and data negative port voltage combinations to provide a corresponding indication signal in response to each corresponding one of the plurality of data positive port voltage and data negative port voltage combinations so that the charging circuit is configured to regulate a bus voltage provided to the needing to be charged device to a corresponding bus voltage value.

16. The charging mode auto-detection module of claim 15, wherein the plurality of data positive port voltage and data negative port voltage combinations include the (0.6V, 0.6V), (3.3V, 0.6V), (3.3V, 3.3V), (0.6V, GND) and (0.6V, 3.3V) combinations.

17. The charging mode auto-detection module of claim 16, wherein:
for the (0.6V, 3.3V) combination, the QC3.0 mode setting module is further configured to detect pulses of the data positive port voltage and pulses of the data negative port voltage, and to control the charging circuit to regulate the bus voltage to increase with a predetermined magnitude in response to each rising edge of the pulses of the data positive port voltage and to decrease with the predetermined magnitude in response to each falling edge of the pulses of the data negative port voltage.

18. The charging mode auto-detection module of claim 1, further comprising:
    a QC3.0 mode determining module, enabled when the charging mode auto-detection module enters into the QC3.0 mode, and configured to detect whether the data positive port voltage is lower than a QC3.0 mode threshold to determine whether the QC3.0 mode matches the needing to be charged device, wherein when the data positive port voltage is higher than the QC3.0 mode threshold, the QC3.0 mode determining module determines that the QC3.0 mode matches the needing to be charged device and is configured to control the charging mode auto-detection module to remain in the QC3.0 mode, and wherein when the data positive port voltage is lower than the QC3.0 mode threshold, the QC3.0 mode determining module determines that the QC3.0 mode does not match the needing to be charged device and is configured to control the charging mode auto-detection module to exit the QC3.0 mode and to reset the charging mode auto-detection module and all the sub-modules it includes.

19. The charging mode auto-detection module of claim 18, wherein:
    the QC3.0 mode determining module is configured to determine that the QC3.0 mode does not match the needing to be charged device when the data positive port voltage is lower than the QC3.0 mode threshold for a predetermined time designed for the QC3.0 mode.

20. The charging mode auto-detection module of claim 1, further comprising:
    a disconnection detection module, coupled to the data negative port, and configured to couple the data negative port to a third predetermined voltage through a high resistance element and to detect whether the data negative port voltage is within a predetermined detection threshold window when the charging mode auto-detection module enters into the BC1.2 mode or the SAMSUNG 1.2V/1.2V charging mode or when the charging mode auto-detection module has entered into the SAMSUNG 1.2V/1.2V charging mode for a second delay time; wherein
    when the data negative port voltage is within the predetermined detection threshold window, the disconnection detection module determines that the needing to be charged device is disconnected from the charging circuit and is configured to reset the charging mode auto-detection module and all the sub-modules it includes; and wherein
    when the data negative port voltage exceeds the predetermined detection threshold window, the disconnection detection module determines that the needing to be charged device is still connected to the charging circuit.

21. The charging mode auto-detection module of claim 20, wherein:
    the disconnection detection module is configured to determine that the needing to be charged device is disconnected from the charging circuit when the data negative port voltage is within the predetermined detection threshold window for a fourth predetermined time.

22. A charging circuit comprising:
    a bus port configured to provide a bus voltage;
    a data positive port and a data negative port; and
    a charging mode auto-detection module coupled to the data positive port and the data negative port, wherein the charging mode auto-detection module includes a voltage dividing charging mode, a BC1.2 mode, a SAMSUNG 1.2V/1.2V charging mode and a QC3.0 mode and is configured to detect which of the charging modes is an adaptable charging mode to a needing to be charged device that is coupled to the bus port, the data positive port and the data negative port, and to generate an indication signal which is indicative of a required charging voltage by the needing to be charged device so that the charging circuit is configured to regulate the bus voltage to the required charging voltage by the needing to be charged device based on the indication signal, and wherein
the charging mode auto-detection module comprises:
    a voltage dividing mode determining module, configured to detect whether a data positive port voltage at the data positive port exceeds a voltage dividing mode threshold window or a data negative port voltage at the data negative port of the charging circuit exceeds the voltage dividing mode threshold window to determine whether the voltage dividing charging mode matches the needing to be charged device, wherein when both the data positive port voltage and the data negative port voltage are within the voltage dividing mode threshold window, the voltage dividing mode determining module determines that the voltage dividing charging mode matches the needing to be charged device and the charging mode auto-detection module remains in the voltage dividing charging mode, and wherein when either the data positive port voltage or the data negative port voltage exceeds the voltage dividing mode threshold window, the voltage dividing mode determining module determines that the voltage dividing charging mode does not match the needing to be charged device, and the charging mode auto-detection module exits the voltage dividing charging mode and enters into the BC1.2 mode;
    a BC1.2 mode determining module, configured to detect whether the data positive port voltage exceeds a BC1.2 mode threshold window to determine whether the BC1.2 mode or the SAMSUNG 1.2V/1.2V charging mode matches the needing to be charged device, wherein when the data positive port voltage is within the BC1.2 mode threshold window, the BC1.2 mode determining module determines that the BC1.2 mode or the SAMSUNG 1.2V/1.2V charging mode matches the needing to be charged device and the charging mode auto-detection module remains in the BC1.2 mode or the SAMSUNG 1.2V/1.2V charging mode, and wherein when the data positive port voltage exceeds the BC1.2 mode threshold window, the BC1.2 mode determining module determines that both the BC1.2 mode and the SAMSUNG 1.2V/1.2V charging mode do not match the needing to be charged device, and the charging mode auto-detection module is configured to exit the BC1.2 mode and the SAMSUNG 1.2V/1.2V charging mode and to pull the data negative port voltage to a reference ground; and
    a QC3.0 mode detecting module, configured to detect whether the data positive port voltage is within a QC3.0 mode threshold window to determine whether the charging mode auto-detection module enters into the QC3.0 mode, wherein when the data positive port voltage is within the QC3.0 mode threshold window, the QC3.0 mode detecting module determines that the charging mode auto-detection module needs to enter into the QC3 .0 mode, and wherein when the data positive port voltage exceeds the QC3.0 mode threshold window, the QC3.0 mode detecting module determines that the charging mode auto-detection module does not need to enter into the QC3.0 mode.

23. The charging circuit of claim 22, further comprising:
a power switch, coupled between a power supply port and the bus port;
a reference signal generation module, configured to receive the indication signal and to generate a reference signal;
a power supply detection module, configured to detect a supply voltage provided to the power supply port and to generate a supply detection signal indicative of the supply voltage;
a power supply regulation module, configured to respectively receive the reference signal and the supply detection signal, and to conduct operation to the reference signal and the supply detection signal to provide an adjusting signal indicative of a difference between the reference signal and the supply detection signal; and
an adjusting port, configured to receive the adjusting signal and to couple the adjusting signal to a feedback signal receiving port of a power supply so that the power supply is configured to adjust the supply voltage to the required charging voltage by the needing to be charged device based on the adjusting signal.

24. A charging mode auto-detection method for a charging circuit, comprising:
entering into a voltage dividing charging mode in default when a needing to be charged device is connected to the charging circuit, setting a data positive port voltage at a data positive port of the charging circuit and a data negative port voltage at a data negative port of the charging circuit to a first predetermined voltage in the voltage dividing charging mode, and disconnecting the data positive port and the data negative port from the first predetermined voltage when the charging circuit exits the voltage dividing charging mode;
determining whether the voltage dividing charging mode matches the needing to be charged device, wherein if the voltage dividing charging mode matches the needing to be charged device, the charging circuit remains in the voltage dividing charging mode, else the charging circuit exits the voltage dividing charging mode and enters into a BC1.2 mode and after entered into the BC1.2 mode for a first delay time, the charging circuit enters into a SAMSUNG 1.2V/1.2V charging mode;
determining whether the BC1.2 mode or the SAMSUNG 1.2V/1.2V charging mode matches the needing to be charged device, wherein if the BC1.2 mode or the SAMSUNG 1.2V/1.2V charging mode matches the needing to be charged device, the charging circuit remains in the BC1.2 mode or the SAMSUNG 1.2V/1.2V charging mode, else the charging circuit exits the BC1.2 mode and the SAMSUNG 1.2V/1.2V charging mode and pulls the data negative port voltage to a reference ground;
detecting whether the charging circuit needs to enter into a QC3.0 mode, wherein if the charging circuit is detected needing to enter into the QC3.0 mode, it enters into the QC3.0 mode, else continuing with the detecting of whether the charging circuit needs to enter into the QC3.0 mode; and
determining whether the QC3.0 mode matches the needing to be charged device in the QC3.0 mode, wherein if the QC3.0 mode matches the needing to be charged device, the charging circuit remains in the QC3 .0 mode, else the charging circuit exits the QC3.0 mode and returns to the voltage dividing charging mode.

* * * * *